US010502855B2

(12) United States Patent
Appleby et al.

(10) Patent No.: US 10,502,855 B2
(45) Date of Patent: Dec. 10, 2019

(54) APPARATUS, SYSTEM AND METHOD FOR REMOTE LOCALISATION OF A MARKER USING MAGNETIC FIELDS

(71) Applicants: Orica International Pte Ltd, Singapore (SG); The Commonwealth Scientific and Industrial Research Organisation, Campbell (AU)

(72) Inventors: Rodney Appleby, Shailer Park (AU); Alexander Theofile Spathis, Newcastle (AU); Kyle Blay, Lindfield West (AU); Keith Leslie, Lindfield West (AU); Marcel Bick, Lindfield West (AU); Byron Wicks, Alumy Creek (AU)

(73) Assignees: Orica International Pte Ltd, Singapore (SG); Commonwealth Scientific & Industrial Org, Campbell (AU)

( * ) Notice: Subject to any disclaimer, the term of this patent is extended or adjusted under 35 U.S.C. 154(b) by 0 days.

(21) Appl. No.: 15/129,395

(22) PCT Filed: Mar. 23, 2015

(86) PCT No.: PCT/AU2015/050120
§ 371 (c)(1),
(2) Date: Sep. 26, 2016

(87) PCT Pub. No.: WO2015/143500
PCT Pub. Date: Oct. 1, 2015

(65) Prior Publication Data
US 2017/0176623 A1    Jun. 22, 2017

(30) Foreign Application Priority Data

Mar. 27, 2014    (AU) .................................. 2014901100

(51) Int. Cl.
*G01V 3/08* (2006.01)
*G01V 3/10* (2006.01)
*G01D 5/14* (2006.01)

(52) U.S. Cl.
CPC .............. *G01V 3/081* (2013.01); *G01V 3/104* (2013.01); *G01D 5/145* (2013.01)

(58) Field of Classification Search
CPC ......... G01V 3/104; G01V 3/081; G01D 5/145
(Continued)

(56) References Cited

U.S. PATENT DOCUMENTS 4,109,199 A     8/1978  Ball et al.
4,812,812 A *   3/1989  Flowerdew ....... E21B 47/02224
                                              324/247
(Continued)

FOREIGN PATENT DOCUMENTS

CA        2288411 A1    3/1994

OTHER PUBLICATIONS

International Search Report, PCT/AU2015/050120, dated Aug. 7, 2015 (6 pages).

*Primary Examiner* — Jay Patidar
(74) *Attorney, Agent, or Firm* — Nixon Peabody LLP

(57) ABSTRACT

A marker for remote localisation in a medium, the marker including a magnetic field sensor configured to measure three different magnetic fields at three different respective times in three dimensions at a marker location in the medium, wherein the marker is configured to generate measurement data representing the measured magnetic fields for determining the marker location.

21 Claims, 14 Drawing Sheets

(58) Field of Classification Search
USPC ................................................ 324/326–329
See application file for complete search history.

(56) References Cited

U.S. PATENT DOCUMENTS

| | | | | |
|---|---|---|---|---|
| 5,646,524 | A * | 7/1997 | Gilboa | G01B 7/004 |
| | | | | 324/207.17 |
| 5,882,304 | A | 3/1999 | Ehnholm et al. | |
| 7,994,773 | B2 | 8/2011 | Schultz | |
| 8,659,298 | B2 * | 2/2014 | Brune | E21B 47/02224 |
| | | | | 324/326 |
| 2003/0163037 | A1 * | 8/2003 | Bladen | A61B 5/06 |
| | | | | 600/424 |
| 2006/0109007 | A1 * | 5/2006 | Takach | G01V 11/00 |
| | | | | 324/326 |
| 2008/0169817 | A1 | 7/2008 | Morrison et al. | |
| 2010/0275934 | A1 * | 11/2010 | Keren | G01D 5/2066 |
| | | | | 128/899 |
| 2013/0307544 | A1 * | 11/2013 | Cole | E21B 47/02224 |
| | | | | 324/329 |
| 2014/0035586 | A1 * | 2/2014 | Rodney | G01V 3/081 |
| | | | | 324/326 |
| 2014/0232408 | A1 * | 8/2014 | Candy | G01V 3/104 |
| | | | | 324/329 |
| 2015/0234074 | A1 * | 8/2015 | Zeller | E21B 47/02224 |
| | | | | 324/326 |
| 2016/0252369 | A1 * | 9/2016 | Zeller | E21B 47/02224 |
| | | | | 324/207.15 |
| 2018/0128648 | A1 * | 5/2018 | Schmitt | G01D 5/1655 |

* cited by examiner

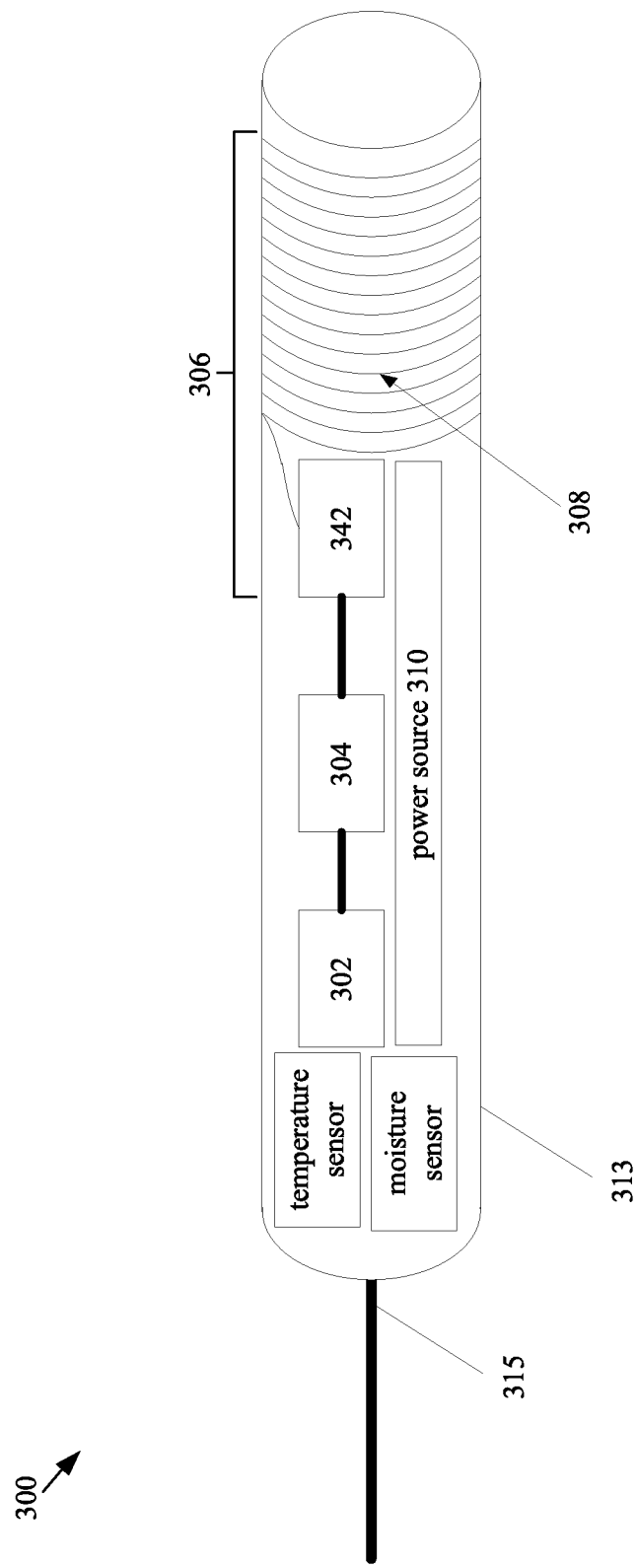

Figure 5

APPARATUS, SYSTEM AND METHOD FOR REMOTE LOCALISATION OF A MARKER USING MAGNETIC FIELDS

RELATED APPLICATIONS

The present application is a U.S. National Stage of International Application No. PCT/AU2015/050120, filed Mar. 23, 2015, which claims priority to and the benefit of Australian Provisional Application No. 2014901100, filed on 27 Mar. 2014, each of which is hereby incorporated by reference herein in its entirety.

TECHNICAL FIELD

The present invention relates generally to apparatuses, systems and methods for remote localisation and remote tracking of objects or boundaries in a medium, e.g., a medium with low magnetic permeability and low electrical conductivity.

BACKGROUND

Existing technologies to locate objects or boundaries in a complex medium (i.e., to determine locations of the objects or the boundaries in the medium), and to track the objects or the boundaries as they move, are limited in their ability to operate with sufficient safety, speed and/or accuracy for various applications, e.g., before, during and after movement and deformation of the medium.

Improved localisation and tracking of objects or boundaries in a medium may be desirable in one or more of the following example applications:

- in mining (e.g., surface mining or sub-surface mining), it may be desirable to locate and/or track boundaries of ore bodies in rock, e.g., after the rock has been blasted and therefore disrupted;
- in mining, it may be desirable to locate and/or track underground explosive devices, e.g., before and/or after a blast;
- in mining or exploration, it may desirable to track drill bits in holes or wells in rock or ground;
- in emergencies, it may be desirable to locate and/or track a person or a piece of equipment buried in an avalanche, a landslide, or a collapsed structure;
- in civil engineering and construction, it may be desirable to locate and/or track a person or a piece of equipment inside a structure; and
- in geological, seismological or construction monitoring, it may be desirable to monitor rock, earth, foundations or structures to determine movement over time.

The lack of available or sufficient localisation and tracking in the above situations may be substantially detrimental. For example, in mining operations, if the boundary between ore and waste is not accurately localised, mixing of ore and waste (which may be referred to as "ore dilution") following a blast may lead to measurable economic losses in a mining operation. These losses can arise from the unnecessary processing of rock whose ore content is below an economic limit, and from losses of value arising from not processing rock whose ore content is above an economic boundary and that is lost as waste material. For example, ore-dilution losses in a single typical gold mine may be up to about $1 million per year, depending on the price of gold, the mine geology, and the mining techniques, etc.

It is desired to address or ameliorate one or more disadvantages or limitations associated with the prior art, or to at least provide a useful alternative.

SUMMARY

In accordance with the present invention, there is provided a marker for remote localisation in a medium, the marker including a magnetic field sensor configured to measure three different magnetic fields at three different respective times in three dimensions at a marker location in the medium, wherein the marker is configured to generate measurement data representing the measured magnetic fields for determining the marker location.

The present invention also provides a marker for remote localisation in a medium, the marker including a magnetic field sensor configured to measure a magnetic field at a marker location in the medium, wherein the marker is configured to generate measurement data representing magnitude and direction of the measured magnetic field for determining the marker location, and wherein the marker is configured to generate magnetic signalling data representing magnetic communication signals of the measured magnetic field.

The present invention also provides a magnetic source system (MSS) for remote localisation, wherein the MSS is configured to generate three different magnetic fields at three different respective times at a marker location through a medium, wherein the MSS is configured to generate magnetic positioning signals for a marker, using the generated magnetic fields, for determining the marker location, and wherein the MSS is configured to generate the magnetic fields in three dimensions.

The present invention also provides a magnetic source system (MSS) for remote localisation of a marker at a marker location in a medium, wherein the MSS is configured to generate a magnetic field at the marker location through the medium, wherein the MSS is configured to generate magnetic positioning signals for the marker, using the generated magnetic field, for determining the marker location, and wherein the MSS is configured to generate magnetic communication signals for communicating with the marker using the generated magnetic field.

The present invention also provides a system for remote localisation of a marker at a marker location in a medium, the system including:

a magnetic source system (MSS) configured to generate three different magnetic fields at three different respective times at the marker location through the medium; and an electromagnetic receiver system (ERS) configured to receive wireless electromagnetic communications signals from the marker through the medium.

The present invention also provides a system for remote localisation of a marker at a marker location in a medium, wherein the system includes:

the MSS; or the marker; and a controller system configured to generate location data representing an estimate of the marker location by processing the magnetic field measurement at the marker location from the marker.

The present invention also provides a system for remote localisation in a medium, the system including any one or more of:

a plurality of markers, each marker being the marker above with a different respective marker identifier (ID);

a plurality of magnetic source system (MSS), each MSS being the MSS above; and a plurality of electromagnetic receiver systems configured to receive wireless electromagnetic communications signals from one or more of the markers through the medium.

The present invention also provides a system for remote localisation of a marker at a marker location in a medium, the system including:

a magnetic source system configured to generate a magnetic field in a selected portion of the medium from a source location, and configured to generate a magnetic signal in the magnetic field;

the marker including:

a magnetic field sensor configured to measure the magnetic field at the marker location in the selected portion of the medium, and configured to receive the magnetic signal, and a marker controller configured to process the magnetic signal to generate magnetic signalling data for controlling the marker; and a controller system configured to receive data representing the magnetic field measurement, and configured to generate location data representing the marker location from the magnetic field measurement.

The present invention also provides a method for remote localisation, the method including the step of:

measuring three different magnetic fields at three different respective times at a marker location in a medium, including measuring the magnetic fields in three dimensions for determining the marker location.

The present invention also provides a method for remote localisation of a marker at a marker location in a medium, the method including the steps of:

measuring a magnetic field at the marker location in the medium, wherein the magnetic field measurement represents magnetic positioning signals and magnetic communication signals;

generating measurement data for determining the marker location from the magnetic positioning signals; and generating magnetic signal data for controlling the marker from the magnetic communication signals.

The present invention also provides a method, including the step of: tracking a plurality of markers in a medium by determining marker locations of the markers using magnetic signals detected by the markers at a plurality of times.

The present invention also provides a marker for remote localisation in a medium, the marker including:

(i) a sensor configured to measure a magnetic field in three dimensions; and (ii) a transmitter configured to transmit, through the medium, a wireless electromagnetic signal representing the measurements of the magnetic field.

BRIEF DESCRIPTION OF THE DRAWINGS

Preferred embodiments of the present invention are hereinafter described with reference to the accompanying drawings in which:

FIG. 3A is a schematic diagram of the marker;

FIG. 5 is a screen shot of a user interface generated by a controller system of the localisation system.

DETAILED DESCRIPTION

Localisation System 100

Figure 1:
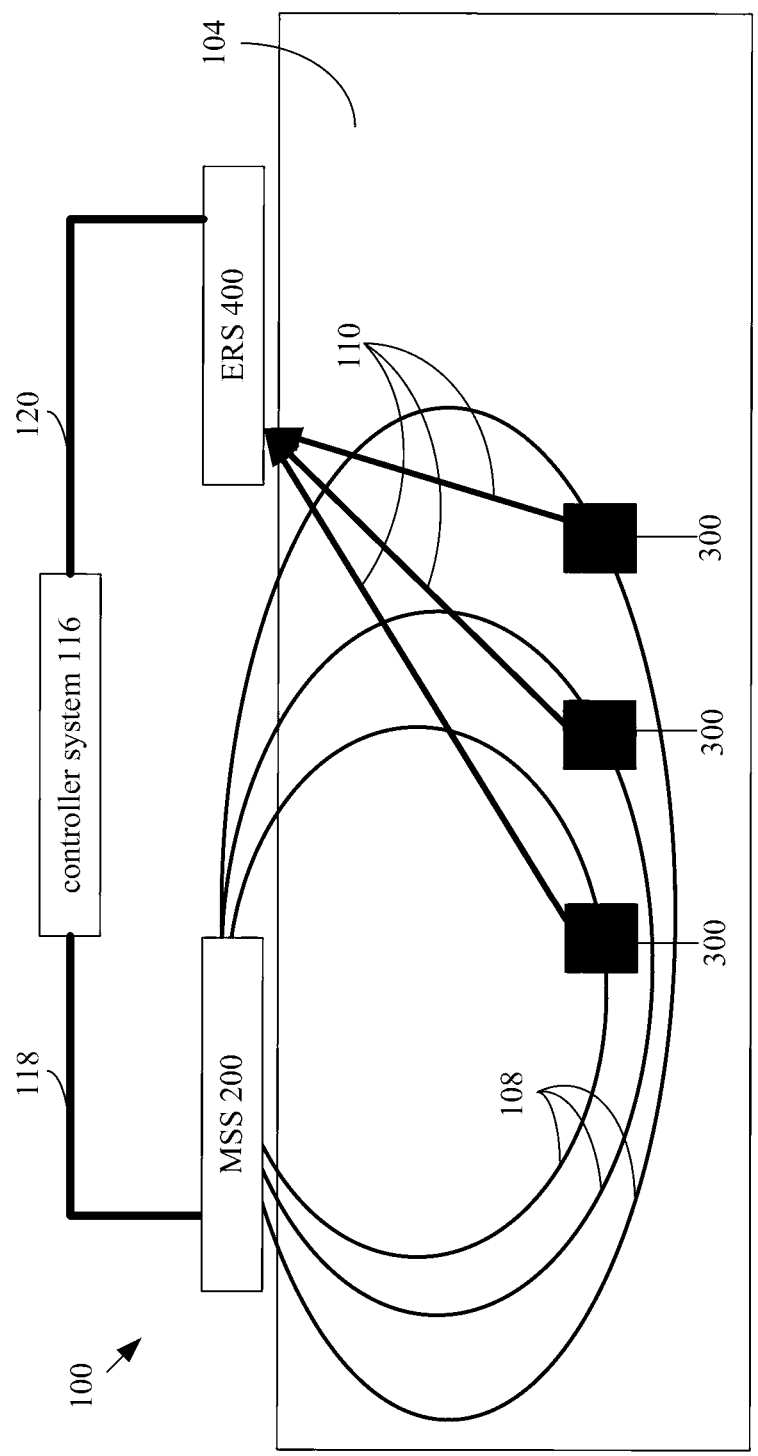
FIG. 1 is a schematic diagram of a localisation system for remote localisation and/or tracking of at least one marker located in a medium.

A localisation system 100 for localisation of a marker 300 in a medium 104 includes, as shown in FIG. 1:

a magnetic source system (MSS) 200 that is configured to generate a magnetic field at a marker location in the medium 104 from a source location that is remote from the marker location, thus providing a magnetic path 108 from the MSS 200 to the marker 300;

at least one marker 300 that is configured to measure the generated magnetic field at the marker location in the medium 104, and configured to generate electromagnetic (EM) waves to transmit a wireless EM signal (e.g., a radio-frequency (RF) signal transmitted by RF waves), representing the magnetic field measurement, along an EM communications path 110 from the marker 300 through the medium 104 to a receiver location that is remote from the marker location;

a EM receiver system (ERS) 400 at the receiver location that is configured to receive the EM signal from the marker 300 over the EM path 110; and a controller system 116 that is configured to communicate with the MSS 200 and the ERS 400, configured to generate location data representing the marker location from the magnetic field measurement, and configured to control the MSS 200 and the ERS 400 to coordinate generation of the magnetic field, making the magnetic field measurement, and receiving the measurement data.

The marker 300 is an apparatus that may be a one-piece device, or object, embedded in the medium. The marker 300 may be part of a larger apparatus with functionality additional to the localisation provided by the system 100, e.g., as described hereinafter in relation to different application areas and different embodiments. In embodiments, the marker 300 may be referred to as a "target" (e.g., a target for localisation and/or tracking), or a "sub-surface marker" when the marker is below a surface of the medium 104. The MSS 200 may be referred to as a "surface magnetic source (SMS)" when the MSS 200 is located on the surface of the medium 104. The ERS 400 may be referred to as a "surface radio-frequency (RF) receiver (SRR)" when the ERS 400 is on the surface of the medium 104 and is configured to receive RF EM signals. The controller system 116 may be referred to as a "user console (UC)" when controller system 116 provides a user interface for operation of the system 100.

The magnetic field extends along the magnetic path 108 from the MSS 200 to the marker 300. The marker location is defined by the location of the marker 300 and configuration of the marker 300 (e.g., the positions of magnetic sensors in or with the marker 300). The magnetic field may be referred to as a "positioning field". The EM path 110 connects the marker 300 to the ERS 400. The magnetic path 108 and the EM path 110 may be referred to as "through-the-earth (TTE)" communications paths, providing TTE communications, when the medium 104 includes earth. The EM path 110 may be referred to as a "through-rock RF link" when the marker 300 and the ERS 400 are configured to communicate using RF frequencies and the medium 104 includes rock. The MSS 200 and the ERS 400 are configured to communicate with the controller system 116, for example using a commercially available communications protocol and/or a wireless radio-frequency (RF) communications protocol, e.g., ZigBee™, which is based on an Institute of Electrical and Electronic Engineers (IEEE) standard.

The system 100 provides remote three-dimensional (3D) localisation, and potentially tracking, of the markers 300 in the medium 104. Localisation, which may be spelt "localization", or referred to as "positioning" or "navigation", refers to determining a position accurately on or in the surface of planet Earth. The system 100 may be referred to as a "dynamic monitoring system" because it can localise the markers 300 more than once, i.e., a plurality of locations can be determined for the markers 300 at a plurality of times. Thus, the markers 300 can be tracked if there is movement of or within the medium 104 between the times, allowing tracking of components of the medium 104 adjacent or near the markers 300.

A portion or a region of the medium 104 that contains the markers 300 may be a selected portion or a selected region that is selected by the configuration and positioning of the MSS 200 and the ERS 400 (e.g., placement and orientation of a magnetic source on the ground) and the nature of the medium 104. The selected region, and thus a relevant portion of the medium 104, may be controlled by moving the MSS 200 and/or the ERS 400 to different orientations and locations during use of the system 100. If markers fall outside the selected region, they are not considered to be ones of the markers 300 that are part of the system 100 (i.e., which may be referred to as "active markers"); however, as the medium 104 moves or as the MSS 200 moves, markers may enter and leave the selected region (e.g., due to flow of a slurry in a processing operation, or due to the MSS 200 and/or the ERS 400 being mounted on moving equipment), and the system 100 may provide localisation in respect of the markers 300 that can detect the magnetic field and communicate with the ERS 400.

The MSS 200 and the ERS 400 need not be embedded in the medium 104 with the markers 300, and thus may be referred to as being "accessible" from outside the medium 104 (or at least from outside the selected portion of the medium 104). In some applications, the MSS 200 and/or the ERS 400 may be at least partially, if not wholly, embedded in material, e.g., underground; however the MSS 200 and the ERS 400 still communicate with the markers 300 through the medium 104, thus the selected portion of the medium 104 may be understood to be material that lies between the MSS 200 and the marker 300 along the magnetic path 108, and between the marker 300 and the ERS 400 along the EM path 110. The MSS 200 and the ERS 400 may be positioned relative to the selected portion of the medium 104 such that the MSS 200 and the ERS 400 remain reliably accessible to persons (referred to as "operators") who are operating and using the system 100 (e.g., in a blasting application, the markers 300 may be in a blasting region, while the MSS 200 and the ERS 400 are out of the blasting region, and are thus not moved or damaged when the medium 104 is disrupted, causing the movement of the markers 300). The MSS 200 and the ERS 400 may be accessible to the operators who are operating the system 100 to locate and track the markers 300. The operators, e.g., mine operators, geologists, civil engineers, rescue personnel, etc., may be located with the controller system 116, e.g., in a control centre, and the controller system 116 may communicate wirelessly with the MSS 200 and ERS 400, which may therefore be remote from the controller system 116 and may thus be at least partially in a dangerous or unstable area where the operators cannot go.

The localisation system 100 performs a localisation method 600 (which may be referred to as a "localisation process") described hereinafter. The localisation system 100 and the localisation method 600 may provide improved safety due to remote or stand-off operation, improved 3D position information, and improved efficiency by localising hundreds of markers in a relatively short period of time.

Magnetic Source System (MSS) 200

Figure 2A:
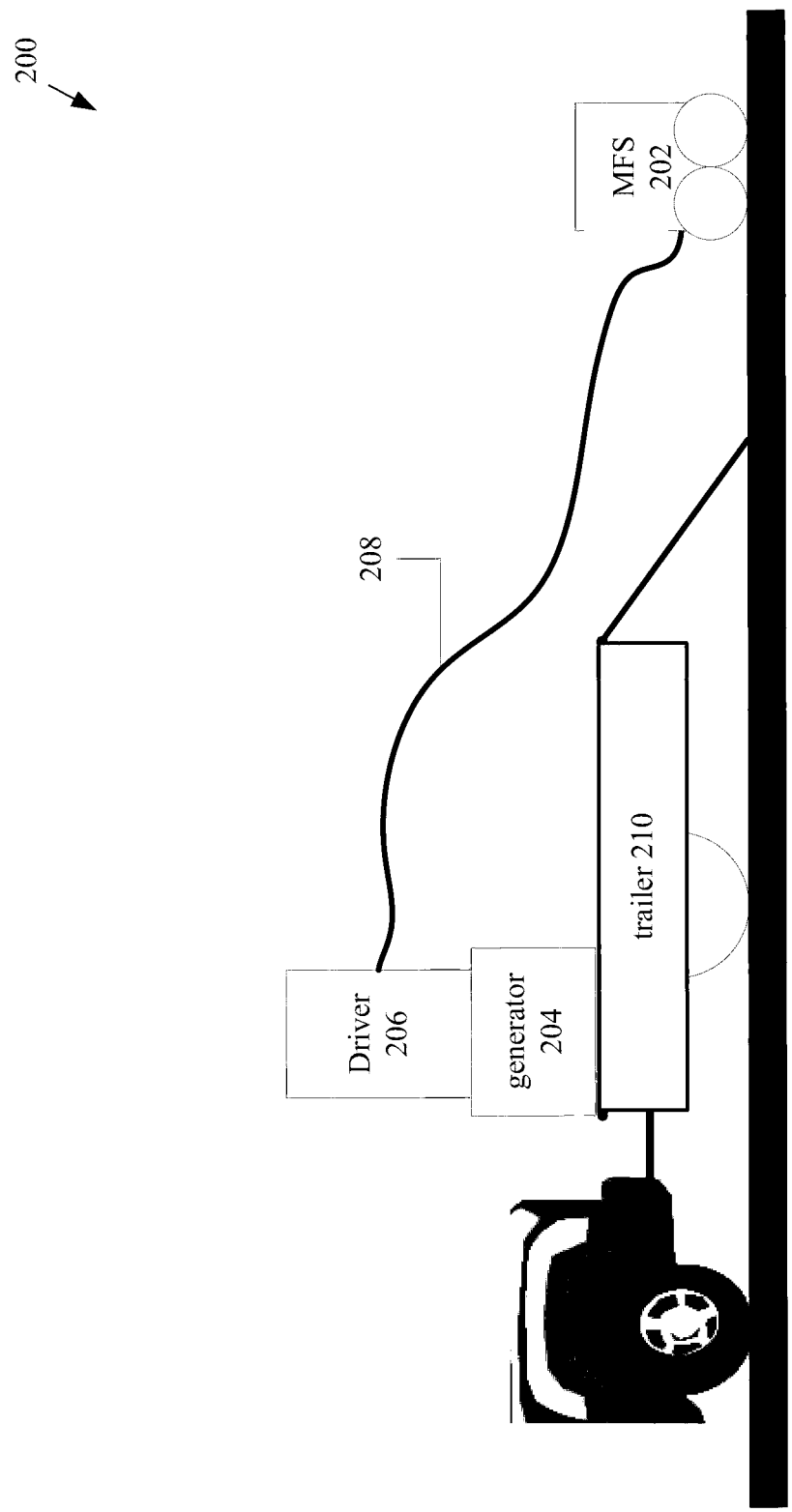
FIG. 2A is a schematic diagram of a magnetic source system (MSS) in the localisation system.

The MSS 200 is an electromagnetic system that generates relatively large magnetic moments in three (orthogonal) dimensions (3D), e.g., along three orthogonal axes ('X', 'Y' and 'Z'). As shown in FIG. 2A, the MSS 200 includes a magnetic field source (MFS) 202 to generate a magnetic field, referred to as "B(f)". The MSS 200 includes: a generator 204 configured to generate electrical power to power the MSS 200; a current driver 206 configured to modulate the generated electrical power from the generator 204; a power cable 208 connecting the current driver 206 to the MFS 202; and a trailer 210 configured to transport the MSS 200, e.g., by a vehicle, and including a deployment ramp to move or roll the MFS 202 into and out of the trailer 210. The trailer 210 may be configured for transporting the MFS 202, generator 204, current driver 206 and a reel for the armoured cable 208. The trailer 210 may include a winch-controlled rear door, hinged at the bottom, which provides the deployment ramp for the MFS 202.

The frequencies in the magnetic field B(f) may be tuned or selected during manufacture and/or operation of the MSS 200, based on: (a) predetermined properties of the medium 104 for expected applications; (b) sensitivity of the marker 300; and (c) expected distance between the source location and the marker location.

Magnetic Localisation

The MSS 200 may generate the magnetic field B(f) with a localisation component (referred to as a "magnetic positioning signal") used for localisation. The MSS 200 may be configured to generate the magnetic field B(f) at the source location such that the magnetic field B(f) is detectable at the marker location by the marker 300 with a selected signal-to-noise ratio to allow determination of the marker location. The localisation component of the magnetic field B(f) may be selected to include frequencies that allow penetration from the source location to the marker location with a selected localisation signal-to-noise ratio through the medium 104 with predetermined properties for the expected application areas. The localisation component of B(f) may be used during a magnetic localisation phase (also referred to as a "position measurement phase") of the localisation method 600.

The frequencies in B(f) may be selected for the magnetic localisation phase based a predetermined magnetic permeability and electrical conductivity of the medium 104, or at least of portions of the medium along the magnetic field path 108. The magnetic localisation frequencies may be selected to be as low as possible to reduce distortion due to permeability and conductivity of the medium 104, while still being sufficiently above 0 Hz to avoid the generally higher low-frequency noise in the magnetic sensor of the marker 300 (sensors generally have higher noise levels at lower frequencies, and this may be avoided by operating a little higher than the minimum of 0 Hz). Lower magnetic localisation frequencies may be preferable for reducing distortion and/or attenuation of the magnetic field at the marker location (referred to as a "localisation field") due to the conductivity and/or the magnetic permeability e.g., for particular applications.

In example applications (e.g., for through-rock communication), the localisation component of B(f) may include a frequency of less than 40 Hertz (Hz)—or in some applications, less than 20 Hz or 10 Hz—and more than 1 Hz. For example, the frequency may be around 5 Hz.

Magnetic Signalling

The MSS 200 may generate the magnetic field B(f) with a signalling component (referred to as a "magnetic communications signal") used for signalling, i.e., communication. The MSS 200 may be configured to generate the magnetic field B(f) at the source location such that the magnetic field B(f) is detectable at the marker location by the marker 300 with a selected signal-to-noise ratio to allow signalling of information from the MSS 200 to the marker 300. The signalling component of the magnetic field B(f) may be selected to include frequencies that allow penetration from the source location to the marker location with a selected signalling signal-to-noise ratio through the medium 104 with predetermined properties for the expected application areas. The signalling component of B(f) may be used during a signalling phase (also referred to as a "communication phase", which may include a "wake-up phase") of the localisation method 600.

The frequencies in B(f) may be selected for the magnetic signalling phase based on a predetermined magnetic permeability and electrical conductivity of the medium 104, or at least of portions of the medium along the magnetic field path 108. The frequencies in B(f) for the magnetic signalling phase may be selected based on the highest frequencies that can be generated easily using the MSS 200 that has also been configured for the lower frequencies of the magnetic localisation phase. For example, an inductance (e.g., of one or more inductive coils in the MSS 200) of the MSS 200 may set a practical upper limit on the magnetic communication frequencies. Higher magnetic communication frequencies may be preferable due to a higher magnetic sensitivity of the marker 300 and/or increased data rates at higher frequencies, despite increased magnetic field distortion and attenuation due to the conductivity and the magnetic permeability of the relevant portion of the medium 104 at higher frequencies because field distortion may be less problematic for the signalling component than the localisation component.

In example applications (e.g., for through-rock communication), the signalling component of B(f) may include a frequency of between 10 and 50 Hz, or between 15 and 40 Hz, or between 30 and 35 Hz, or around 31 Hz (e.g., 31.25 Hz). A specific central frequency, e.g., 31.25 Hz may be selected to simplify a decoding process (described hereinafter) performed by the marker 300.

The magnetic signalling component includes magnetic signals, generated by the MSS 200. The magnetic signals may cause the marker 300 to wake up and represent information to guide the subsequent measurement process.

The MSS 200 may send short communication packets or packages or payloads (which may be referred to as "magnetic communication packages" including "magnetic signalling data") in the magnetic signalling component of B(f) to be acquired by the magnetic sensor of the marker 300. The magnetic signalling data may alert the marker 300 that the localisation component of B(f) is to be generated in the near future. The magnetic signalling data may represent inversion parameters to be used by the marker 300 during the localisation process. The magnetic signalling data may represent a time reference to be used by the marker 300 during the subsequent measurement and data read-out processes.

The magnetic signalling data "magnetic signalling data" may be encoded to include error correction. In an example, the magnetic signalling data may be encoded using Golay codes, which may be very simple for the marker 300 to decode and may allow for significant bit-error detection and correction by the marker 300. Each Golay-coded block may include 12 bits of data and 12 parity bits. Three blocks may be used, thus 36 bits of data may be encoded into 72 transmitted symbols in the magnetic signalling data. The magnetic signalling data may be modulated using a binary phase-shift key (BPSK) scheme on the at least one carrier in the magnetic communication frequencies of B(f) (e.g., a carrier of 31.25 Hz), e.g., using 32 cycles per symbol, or approximately 1 symbol per second. Each magnetic communication package may have a 4-bit command field and 8-bit circular redundancy check (CRC) field, and the command field may provide for up to 16 different commands. The marker 300 determines the CRC-8 using look-up tables, and compares the determined CRC8 to a table entry to verify the validity of each packet. As each magnetic communication package may include 36 bits of data with an 8-bit cyclic redundancy check (CRC-8), thus the magnetic signalling data may include 88 coded bits to be transmitted including the coding scheme and the validity check. Thus each transmission duration may be for example approximately 90 seconds. Since a marker 300 may only detect a transmission mid-way therethrough, at least two transmissions may be used, thus a minimum wake-up duration of the marker 300 may be selected at least twice the minimum transmission duration (e.g., approximately 180 seconds, or 3 minutes). The marker 300 may be configured to wake up and listen for a magnetic signal periodically, with a delay equal to about the transmission duration (e.g., every 90 seconds at most).

The magnetic signalling data payload may represent the following for controlling the marker 300:

a command for the marker 300 (e.g., Measurement, Retransmit, Hibernate, Program, etc.);

a sequence number (e.g., unicast address or broadcast); and/or a data field (a time to measurement, a time to hibernate, a serial number, etc.).

The marker 300 may be configured to respond to the command in the magnetic signalling data. The command may be one or more of the following:

a measurement command representing a commencement time for the measurement signal;

a retransmit command commanding the marker 300 to retransmit measurement data representing the magnetic field measurement;

a standby command commanding the marker 300 to enter a low power standby mode;

a hibernate command commanding the marker 300 to enter an ultra-low power hibernate mode;

a program command associating a sequence number with an identifier (ID) of the marker 300 (e.g., the marker's serial number which may be a quasi-unique marker ID); and/or a set time command commanding the marker 300 to keep real time.

The program command may be used during an initialisation phase of each marker 300 that occurs prior to placement of the marker 300 in the medium 104, and potentially away from a site of the application. This initialisation phase may therefore be referred to as a "local" magnetic communication phase to distinguish it from communication through the medium 104, which may be referred to as "remote" magnetic communication. In the local communication phase, the program command may be transmitted at a higher bit-rate because there may be less attenuation between the marker 300 and either the MSS 200 or a separate programming system that generates magnetic communication signals (or other signals detected by the marker 300) for use in the local communication phase. The local communication phase may thus be used to initialize many markers quickly.

The measurement command may be configured to control the marker 300 to measure the magnetic localisation signal and to store positioning measurement data representing the measured field. The measurement command may be transmitted repeatedly during the wake-up phase to alert the marker 300 when the measurement phase is due to commence. For each successive transmission, the time to measurement (representing the commencement time) decreases as the measurement phase approaches. The measurement command packet may enable up to a 4.5 hour wake-up time. The command field can indicate that a selected one of a predetermined plurality (e.g., four) of measurement regimes is to be executed. Each of the measurement regimes may have different pre-set values for measurement parameters, e.g., measurement duration, measurement frequency and measurement ordering.

The standby command packet may be configured to instruct the marker 300 to enter the standby mode described hereinafter.

The hibernate command packet may be configured to instruct the marker 300 to enter a long-duration ultra-low power hibernation mode. In the hibernation mode, instead of periodically waking up to listen for a transmitting magnetic source, the marker 300 remains in a low-power state and keeps time, e.g., using an internal low-power, low-frequency oscillator. The hibernation mode may be used to put the marker 300 to sleep overnight, or at weekends, or while in storage, i.e., when no measurement is expected. The hibernation mode may be used to provide a significant delay between initial power-up and programming, and a first measurement (e.g., a period of days, weeks or months). In an experimental example, the hibernate command was used to force the experimental markers to hibernate for seven hours between placement in respective bore-holes and a scheduled measurement time.

The retransmit command may be configured to instruct the marker 300 to retransmit the measurement data. The retransmit command packet may be used after a main measurement sequence when the marker 300 has been identified by the controller system 116 as having failed to transmit the measurement data. For a plurality of markers 300, the retransmit command packet can be generated for each of the markers (e.g., by sequence number or marker ID) that has failed to return measurement data, e.g., two at a time. When a marker 300 recognizes its marker ID in the retransmit command, the marker 300 re-transmits the measurement data. If a plurality of markers 300 are identified in the retransmit command, the first-identified marker may transmit immediately, the second-identified marker may transmit after a first retransmit delay time, and each subsequently identified marker may transmit after a corresponding further delay time to each retransmitting marker transmits alone. If the marker 300 receives the retransmit command but does not identify its ID, the marker 300 may resume a low-power standby mode.

The program marker command may be configured to program the marker 300 with its ID (e.g., sequence number). The program marker command may be transmitted in the local magnetic communication phase before the marker 300 is in the medium 104 for similar reasons to those described above with reference to the initialisation phase. The marker ID may be associated with a visible ID (e.g., a barcode) on the outside of the marker 300.

The set time command may be configured to control the marker 300 to keep real time, e.g., following the day of the week and the time of the day. The marker 300 may be controlled to enter the hibernate mode during preselected inactive times each day or each week, e.g., from 8 p.m. to 5 a.m. and/or at weekends.

The command packages may be configured to control the marker 300 to retransmit the positioning measurement data a selected number of times with a selected wait time between each transmission.

The command packages may be generated by the MSS control 232 described hereinafter.

MFS 202

The source location is a location defined by configuration and placement of the magnetic field source (MFS) 202 relative to a reference frame for the localisation system 100 (e.g., a site reference frame). The MFS 202 is configured to generate the magnetic field B(f) in more than one dimension, thus the magnetic field B(f) and/or the MFS 202 may be referred to as "multi-axial".

The MFS 202 may be a rotating commercially available magnetic (e.g., a permanent magnet (PM)). The rotating magnet may be rotated in 3D using commercially available electric motors (e.g., stepper motors, direct-current motors, etc.) mounted in a jig to allow controlled motion in all three dimensions. For the localisation method 600, the axis of rotation of the permanent magnet may be moved in sequence through the three axes of the source reference frame. The jig holds the rotating magnet in at least three rotating orientations to cover the three axes, with a centre of the rotating magnet at the same position for each rotating orientation, and this centre position defines the source location in the inversion process described hereinafter. The MFS 202 can thus generate three different magnetic fields at three different times (respectively) with three different (respective) orientations: e.g., first with the rotating magnet in a first orientation, then second with the rotating magnet in a second orientation (that in not parallel with the first orientation), and then third with the rotating magnet in a third orientation (that in not coplanar with the first and second orientations). The marker 300 detects these three magnetic fields in sequence. The rotating magnet may be mounted in a plastic housing. A controller may be used to control the modulation frequency of the magnetic field, e.g., including a Hall-effect sensor. A synchronisation (sync) signal may be generated using the Hall-effect sensor and/or an optical position sensor, and the sync signal may be wired to control the speed of the rotating magnet, and thus the frequency of the magnetic positioning signals. Magnetic communication signals can be generated by varying the rotation rate of the rotating magnet.

Figure 2B:
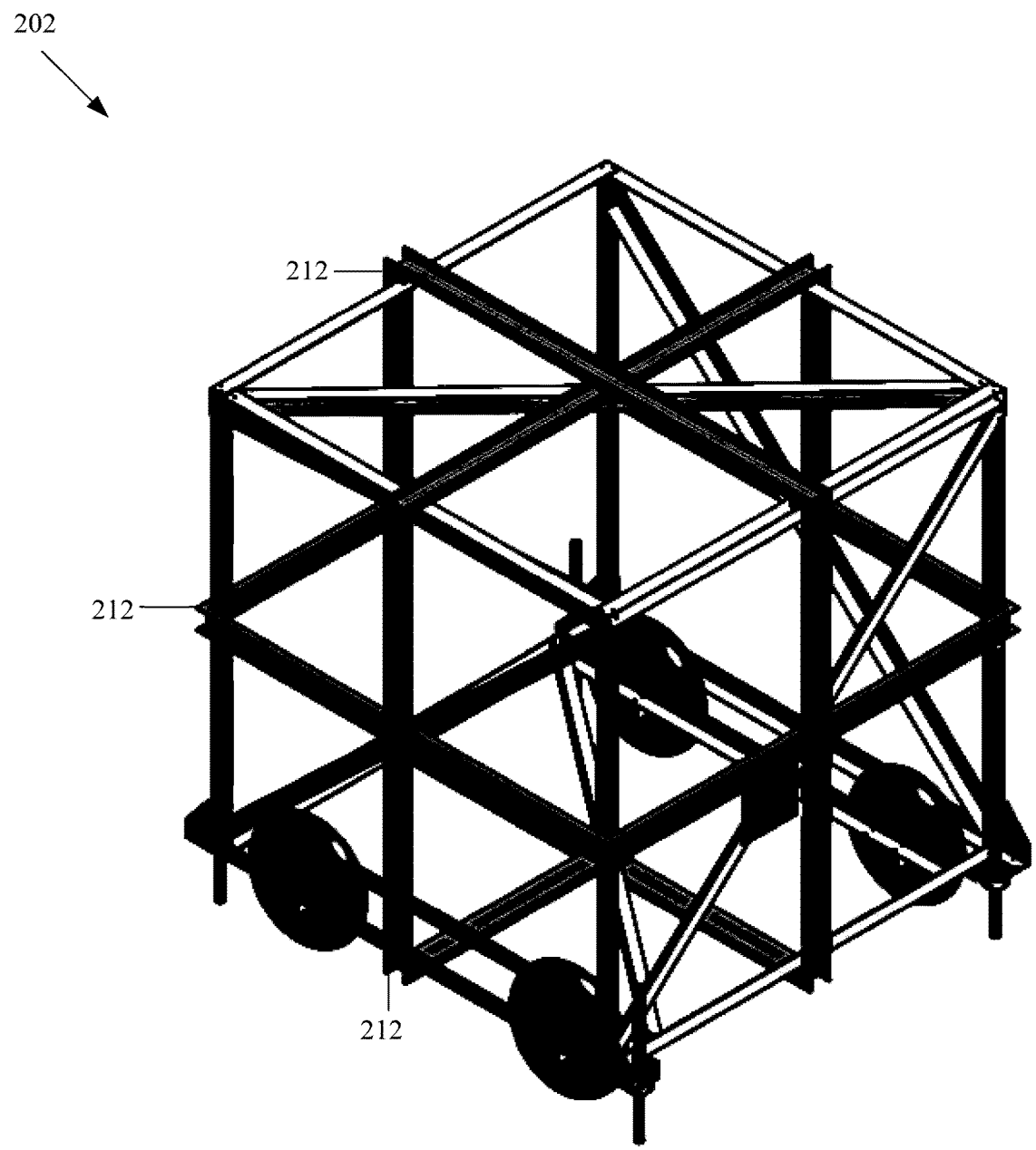
FIG. 2B is a diagram of a perspective view of a magnetic field source (MFS) with a space frame.
Figure 2C:
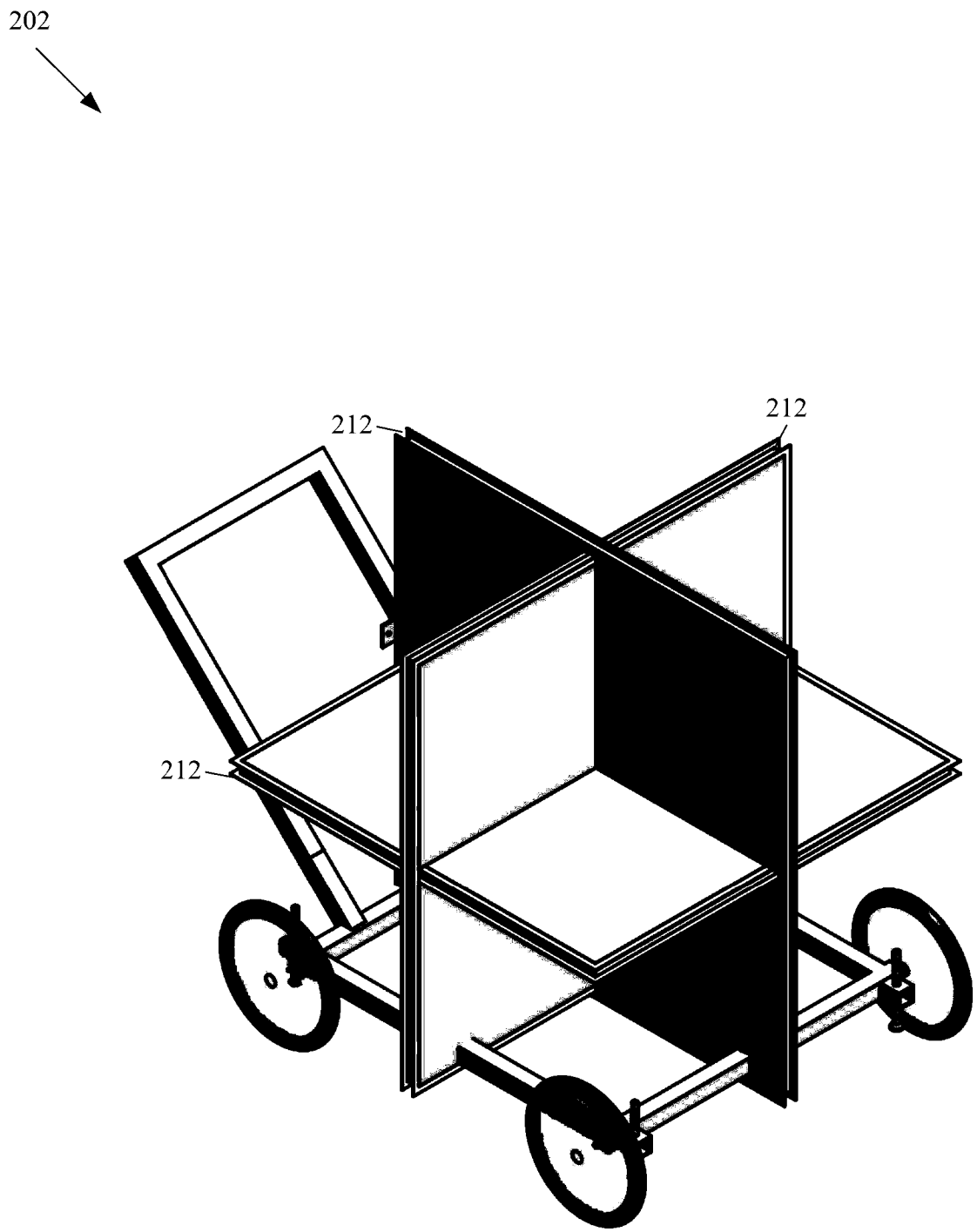
FIG. 2C is a diagram of a perspective view of a magnetic field source (MFS) of the MSS with a panel frame.

The MFS 202 may be an electromagnet coil set including one or more electromagnetic coils 212 (which may be electromagnets) oriented and mounted in the three dimensions (e.g., three orthogonal coils), or moveable to cover the three dimensions (e.g., using a jig), such that the coil or coils have a common central point that defines the source location in the inversion process, i.e., the centres of the coils are co-located at a geometrical origin of the coil set. The MFS 202 can thus generate three different magnetic fields at three different times (respectively) with three different (respective) orientations: e.g., first with the coil in a first orientation, then second with the coil in a second orientation (that in not parallel with the first orientation), and then third with the coil in a third orientation (that in not coplanar with the first and second orientations). The marker 300 detects these three magnetic fields in sequence. Each electromagnetic coil 212 generates an oscillating dipole field. The MFS 202 may be an array of three orthogonal dipole electromagnets with a magnetic field oscillating at between 1 and 100 Hz. Each coil may be a rectangular winding of enamelled copper wire. As shown in FIGS. 2B and 2C, each coil 212 may wound around the outside of a cube-shaped frame. To achieve a magnetic source strength sufficient for some applications, the coils 212 may be between 1 and 2 metres along each side (e.g., 1.5 m across). The frame may be sufficiently strong to support the weight of the coils 212 (e.g., between about 5 kilograms and 30 kg each, or between 10 and 20 kg each, or about 15 kg each), and sufficiently rigid to ameliorate any field distortion that may be caused by movement (e.g., twisting) of the coils 212 relative to the magnetic source location (i.e., the origin point). The rotational movement at the edge of each coil 212 may be limited to less than 5 millimetres, or less than 4 mm, or less than 3 mm, or less than 2 mm, or less than 1.31 mm, or less than 1 mm. In an experimental example, rotation of the fields produced by the coil set during operation (e.g., by bending or coil set movement) were less than 0.6° or 0.57°. The coil set frame may be formed of non-conductive materials to ameliorate eddy current generation in the coils 212 (which may increase loss and decrease accuracy). The coil set frame may be nonferrous to ameliorate magnetic field distortion. The coil set frame may be a plastic or a composite material, e.g., fibreglass-reinforced plastic. The coil set frame may be relatively light in weight to allow for convenient transportation and manual handling. The coil set frame may include a space frame, e.g., as shown in FIG. 2B. The coil set frame may include a panel frame, e.g., as shown in FIG. 2C. The space frame may include lengths of pultruded fibre reinforced plastic (FRP) of various profiles, cut to length to support the three orthogonal coils 212. The coils 212 may be wound in U-channels around orthogonal axes of the frame. The coils 212 may be fixed in place by flooding the U-channels with an electrical epoxy. The MFS 202 may include wheels mounted on the frame for movement.

Current Driver 206

The generator 204 may include a commercially available generator set ("genset") with a diesel engine and a rated continuous output power of 4.5 kVA, and may provide a single phase alternating current (AC) output, e.g., 240 root-mean-squared Volts (Vrms).

Figure 2D:
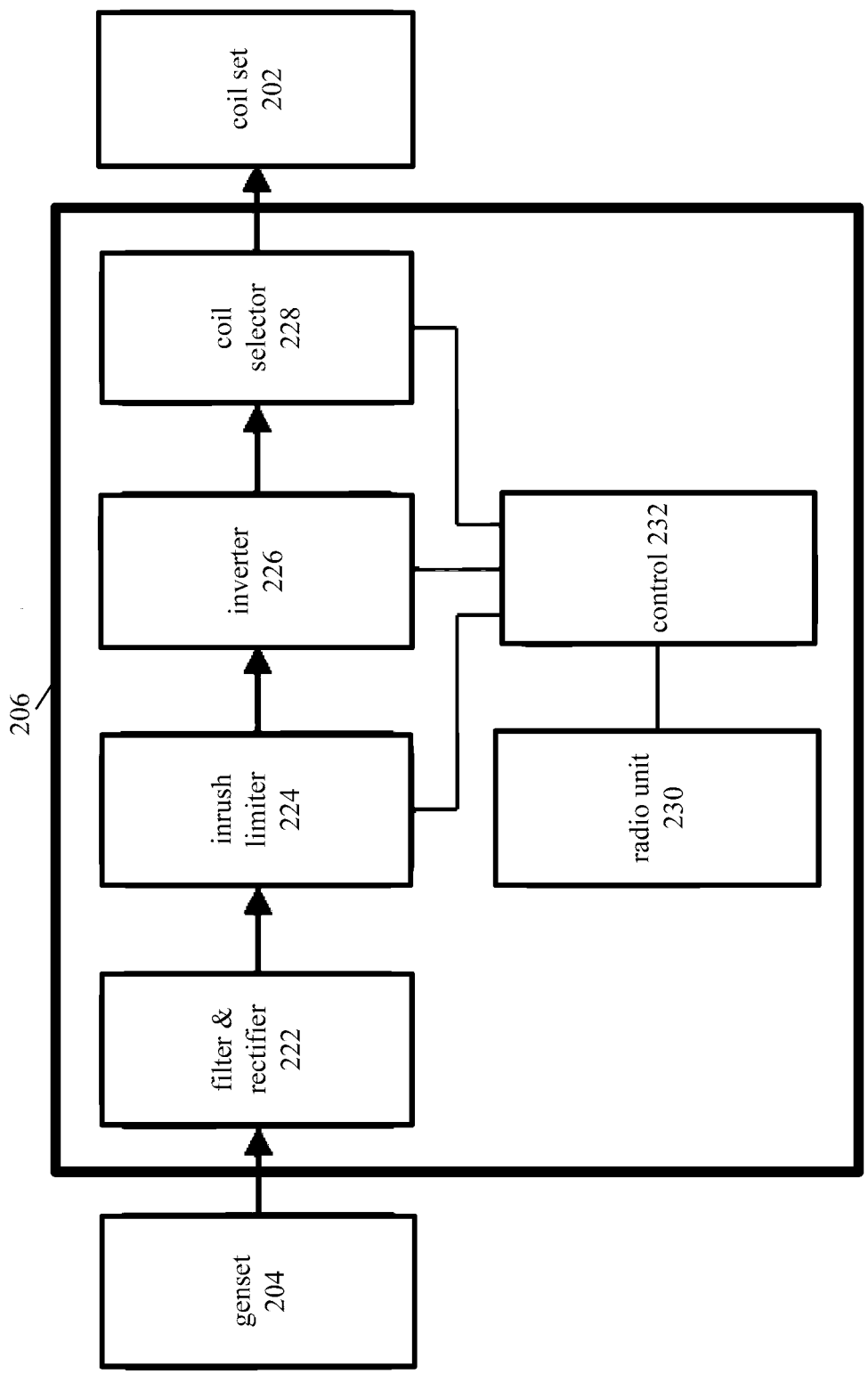
FIG. 2D is a block diagram of a current driver of the MSS.

As shown in FIG. 2D, the current driver 206 includes a filter and rectifier 222 to rectify the AC power from the generator 204 into a direct current (DC) voltage for an inverter 226 of the current driver 206. The current driver 206 includes an inrush limiter 224 between the rectifier 222 and the inverter 226. The inrush limiter 224 may include a DC link capacitor bank, e.g., with a capacitance of 8,100 micro Farads (uF), and a resistance that allows a selected period of time for charging of the capacitor bank. The current driver may include a control 232 (e.g., a microcontroller) configured to switch electromechanical relays in a coil selector 228 to connect output from the inverter 226 to a selected one of the coils 212.

The inverter 226 may be a computer-controlled high-current H-bridge type current driver using pulse width modulation (PWM) at frequencies between 2 and 30 kHz to drive an approximated current waveform into the coil 212. The control 232 drives PWM control signals for the inverter 226. The control 232 measures the current flowing in the coils 212, switches the relays in the coil selector 228 between the three coils 212, monitors temperatures of the coils 212, and receives and processes top-level control commands from the controller system 116 via a communications unit 230 (e.g., Zigbee™ or Wi-Fi™ according to the IEEE 802.11 standards) in the current driver 206. The control 232 may determine the temperature of the coils 212 by measuring the resistance of an energised coil 212.

The control 232 may include a commercially available microcontroller, e.g., a floating-point device configured for high-speed motor controllers with a plurality of pulse-width-modulation (PWM) peripherals built in. The microcontroller may operate at 150 MHz, include 68 KiB of RAM, 512 KiB of flash memory, UARTs, ADC and DAC peripherals, and general-purpose I/O. Instructions executable by the control 232 may be generated from C or C++ code using a commercially available compiler and linker, together with available header files and libraries. The instructions may provide two threads. The instructions may provide a first thread driven by a regular (2 kHz) PWM interrupt service routine that measures the current flowing in the coil set 212, then calculates and updates the PWM controller registers to drive the next cycle of the excitation waveform. The instructions may provide a second thread in a foreground execution path that controls an overall state of the control 232, and processes commands received from the radio unit 230, including sending responses via the radio unit 230 as required.

The control 232 may include a state machine with a plurality of states. The states may include a startup state that moves to an idle state that moves to a ready state. The ready state moves to and from a temperature measurement state for measuring the temperature in the coils 212. The ready state moves to and from a command-acquiring state for receiving commands from the controller system 116. The command-acquiring state may, if a received command sequence is valid, move to an execution state (also referred to as an "execute state") in which commands in the command sequence are executed. After execution, the execute state may return to the ready state.

Marker 300

The marker 300, as shown in FIG. 3A, includes:
  a magnetic field sensor 302 configured to receive the magnetic signals from the MSS 200 by measuring the magnetic field produced by the MSS 200;
  a processor module 304, including at least one computer processor, and a power module for powering the computer processor which may be referred to as a "processor component" or a "marker controller", in electrical communication with the magnetic field sensor 302; and
  a transmitter module 306 in electrical communication with the processor module 304 including an EM transmit antenna 308 for transmitting the EM signals along the EM paths 110 to the ERS 400.

The magnetic field sensor 302, the processor module 304 and the transmitter module 306 may be separate modules, linked by digital communication interfaces, and may be provided by electronic components mounted on a single shared electronic circuit board.

Magnetic Field Sensor 302

The magnetic field sensor 302 may be referred to as a "magnetic sensor", and/or a "magnetic field detector". The magnetic field sensor 302 may be formed as an instrument or an apparatus. The magnetic field sensor 302 may be a unitary device in a single housing, or a plurality of connected devices in the marker 300.

The magnetic measuring performed by magnetic field sensor 302 may be referred to as "sensing" or "detecting". The magnetic measuring includes at least generating an electrically detectable signal (e.g., using an electrical current, an electrical voltage, an electrical resistance, a inductance, a capacitance, etc.) that represents the magnetic field at the marker location, including the strength (magnitude) and direction of the magnetic field in one, two or three dimensions: the magnetic field sensor may thus be referred to as a vector magnetic field sensor or "vector magnetometer".

The magnetic field sensor 302 may be configured to measure at least one magnitude and at least one direction of the magnetic field at the marker location. The magnetic field sensor 302 may be configured to measure the magnitude and the direction in three spatial dimensions simultaneously and/or individually. The magnetic field sensor 302 may measure the magnetic field along one or more orthogonal directions at the marker location. The magnetic field sensor 302 may measure a plurality of orthogonal components of the magnetic field, e.g., along a plurality of Cartesian axes at the marker location. The magnetic field sensor 302 may include a plurality of uniaxial magnetic sensors (also referred to as linear or one-dimensional magnetic sensors) that measure the plurality of orthogonal components respectively. The plurality uniaxial magnetic sensors are aligned so as to measure signals in all three dimensions: the uniaxial magnetic sensors may be aligned mutually orthogonally, but may be aligned in other orientations, so long as all three directions are represented, i.e., so that no more than one uniaxial sensor lies in each direction, and no more than two uniaxial sensors lie in each two-dimensional plane, i.e., such that two of the three uniaxial magnetic sensors are not parallel and such that the three uniaxial magnetic sensors are not coplanar. The magnetic field sensor 302 may be a triaxial magnetic field sensor packaged into two devices: one device having a single uniaxial sensor mounted vertically for the 'Z' axis, and a second device containing two uniaxial sensors mounted horizontally, e.g., for the 'X' and 'Y' axes. In general, the magnetic field sensor 302 measures three of the orthogonal field components, e.g., corresponding to the three Cartesian axes at the marker location, and the magnetic field sensor 302 may be referred to as a "tri-axial" magnetic field sensor. The magnetic field sensor 302 may measure both magnetic field strength and magnetic field direction for each direction, e.g., magnetic field strength and magnetic field dimension (e.g., positive or negative) along each of the three Cartesian axes at the marker location.

The magnetic field sensor 302 may include one or more Gaussmeters and/or one or more inductive sensors. The Gaussmeters detect a static or quasi-static magnetic field directly. The inductive sensors detect induced currents caused by fluctuation of a magnetic field according to Faraday's law of induction. (The term "magnetometer" may be used to refer to both types of magnetic field sensor, although in some circumstances a magnetometer may refer more specifically to a Gaussmeter, i.e., a device that operates without Faraday induction). The Gaussmeters may include rotating-coil magnetometers, Hall-effect magnetometers, magnetoresistive sensors (including anisotropic magnetoresistive (AMR) sensors, and/or giant magnetoresistive (GMR) sensors), fluxgate magnetometers, superconducting quantum-interference device (SQUID) magnetometers, spin-exchange relaxation-free (SERF) atomic magnetometers, and optical magnetometers. The inductive sensors may include search-coil sensors, and magnetoinductive magnetometers (which include a conductive winding on a ferromagnetic core).

An example of the magnetic field sensor 302 may have the following performance characteristics:
- a linearity across an application-specific frequency range of less than 1%±10 micro Tesla (μT);
- a sensitivity or noise floor of less than 150 pico Tesla (pT)/root-Hz at 5 Hz; and
- a stability of orthogonality of less than 0.25°.

Figure 3B:
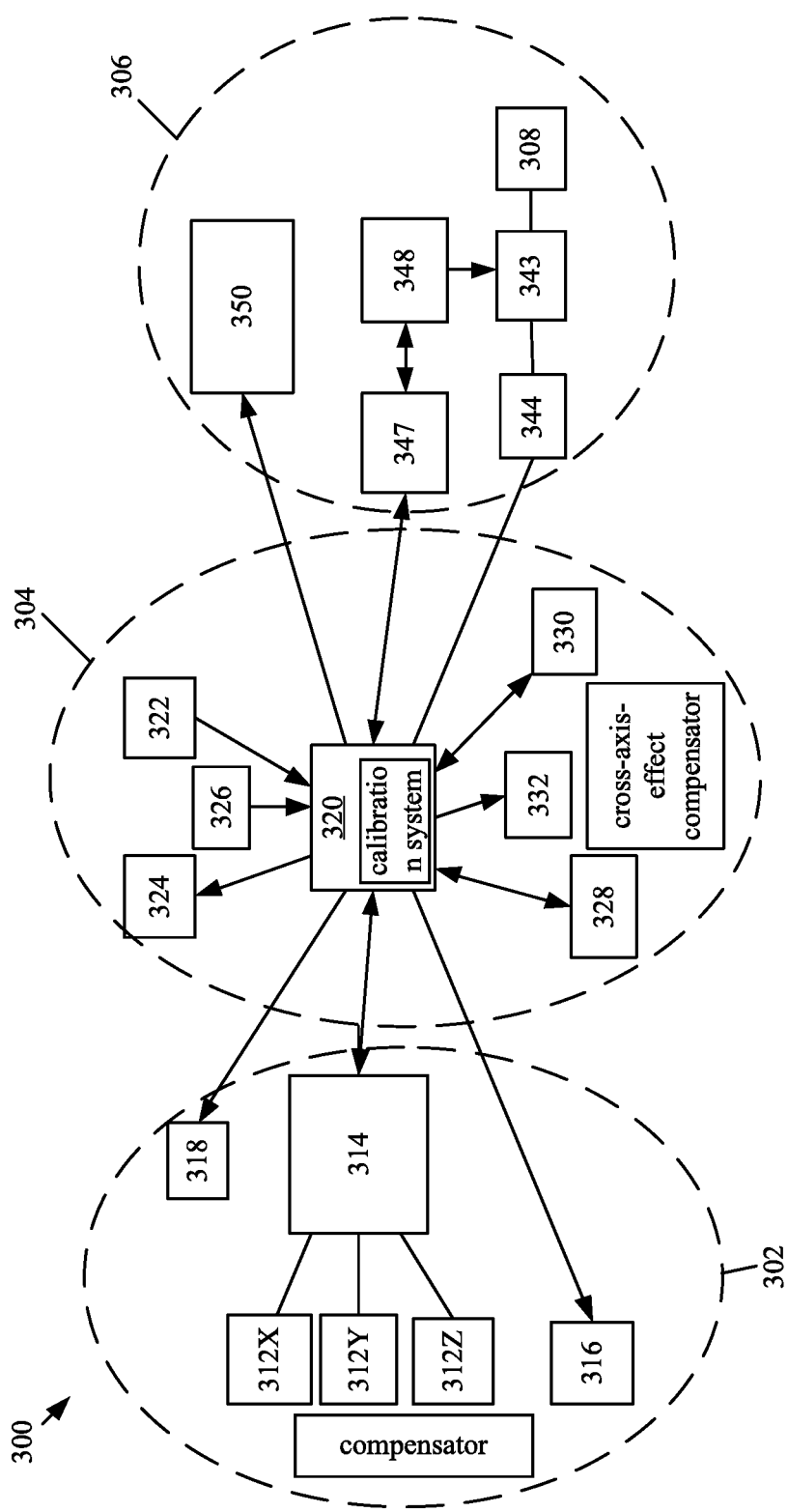
FIG. 3B is a block diagram of operational modules of the marker.

The magnetic field sensor 302 may include three magnetic sensors 312, in sensor channels for the three spatial dimensions along the respective axial directions X, Y and Z. As shown in FIG. 3B, the magnetic field sensor 302 may include three magnetic sensors 312X, 312Y, 312Z (e.g., AMR sensors available commercially from Honeywell International) mounted orthogonally to measure the three dimensional vector components of the magnetic field.

Figure 3C:
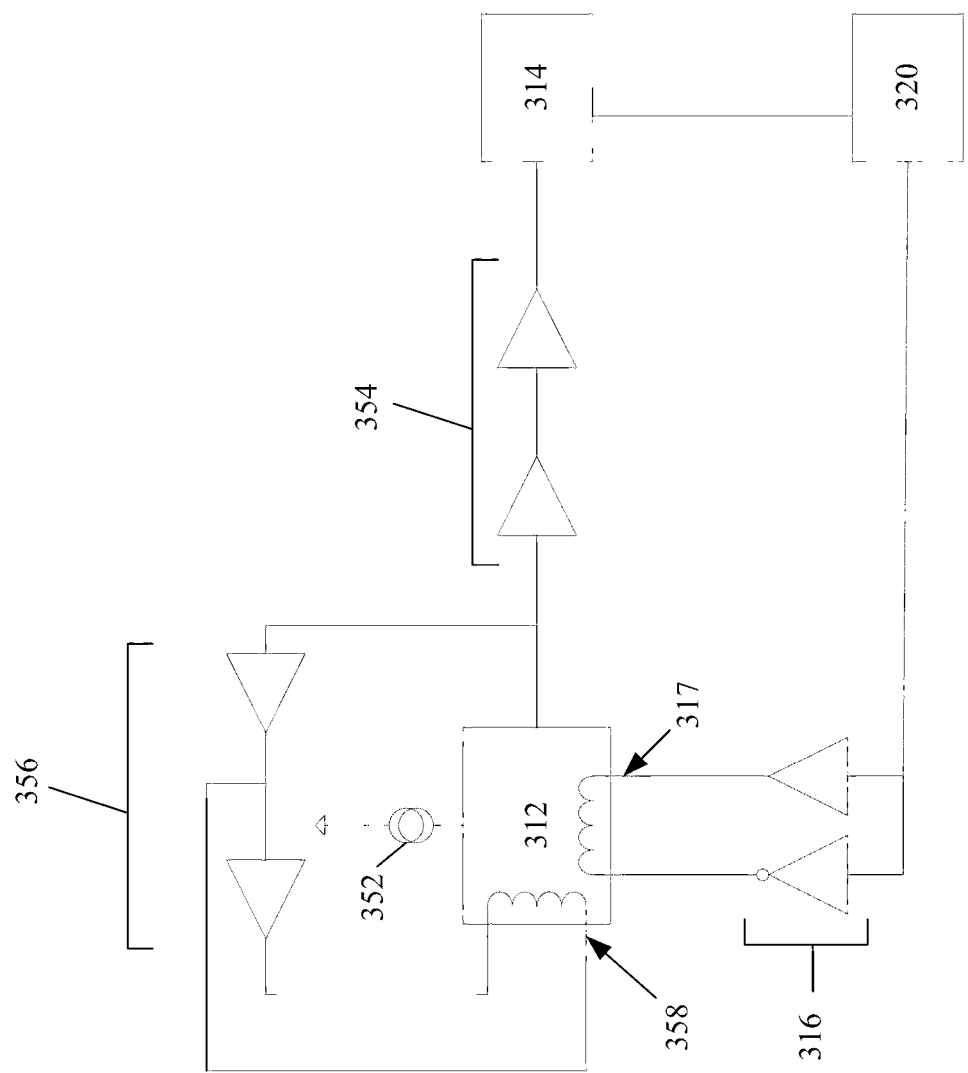
FIG. 3C is circuit diagram of a magnetic field sensor portion of the marker.

Each sensor 312X, 312Y, 312Z may include a four-element Wheatstone bridge circuit to output a voltage proportional to the sensed magnetic field along its sensitive axis. As shown in FIG. 3C, the magnetic field sensor 302 may include a constant current source 352 for the Wheatstone bridge current. The differential output of each Wheatstone bridge circuit may be buffered and filtered by a four-pole anti-aliasing filter 354 for sampling by a 24-bit analog-to-digital converter (ADC) 314 of the magnetic field sensor 302.

Each sensor 312X, 312Y, 312Z may include: a first helically wound feedback coil (referred to as a "feedback strap" 358) that may be used to cancel or minimise an unwanted external magnetic field seen by the sensor; and a second helically wound coil (or reset strap 317) that may be used for resetting magnetization of devices in the magnetic sensor that detect the magnetic field along the sensitive axis, as described further hereinafter.

The magnetic field sensor 302 may include a push-pull driver 316 to reset the magnetic sensors 312 (e.g., by resetting the magnetization of the AMR sensors). The push-pull driver 316 realign magnetization of magnetic domains in the sensor to maximize the sensitivity of the sensor. The push-pull driver 316 may be used to change the polarity of the differential output voltage for a given applied field, thus the domains can be set in one direction, or reset in the other direction. The push-pull driver 316 may drive a current through the reset strap 317 of the magnetic sensor 312 to set and/or reset the sensor 312.

The magnetic field strength generated by the MSS 200 at the marker location may be from about 0.05 nano Tesla (nT) to about 5,000 nT, which is a fraction of the Earth's static geomagnetic field with a strength of about 40-60 micro Tesla (μT). To measure the magnetic signals on top of the Earth's magnetic field signal requires a high dynamic range in the magnetic field sensor 302. The dynamic range of the magnetic field sensor 302 may be improved using a nulling system. The nulling system may reduce or remove measurements of the Earth's magnetic field from the signal generated by the magnetic sensors 312 before it reaches the sampling circuitry with the ADC 314, thus relaxing dynamic range requirements of the sampling circuitry. The nulling system may allow the magnetic sensor 312 to operate in the most sensitive and linear part of its field-voltage characteristic curve. The nulling system may have a corner frequency (fc) of less than 1 Hertz (Hz), below which detected variations are annulled. The nulling system may include a low-frequency analogue nulling circuit 356 connected between the output of the magnetic sensor 312 and the feedback strap 358 of the magnetic sensor 312, as shown in FIG. 3C. The nulling system may also be implemented using alternative circuitry, including digitally-implemented circuits (e.g., based on machine-readable computer code).

The magnetic field sensor 302 may include a compensator to compensate for manufacturing variations in the magnetic sensors 312. The compensator may include circuit components, e.g., resistive elements, connected the magnetic sensors 312 in the magnetic field sensor 302 so that the output electronic signal is zero for zero applied magnetic field. The compensator value may be selected experimentally for each magnetic sensor 312, and for each example magnetic field sensor 302. In an example compensator, large value (100-200 Ωk) trimming resistors may be mounted across one branch of an AMR bridge to slightly increase the current flowing in that bridge and reduce the offset to zero. In another example compensator, a digitally controlled resistor device may be used to correct for the signal offset from manufacturing variations. The compensator may function in parallel with the nulling circuit 356 to compensate for measurement fluctuations due to temperature drift and cross-axis modulation experienced by the magnetic field sensor 302, as described further hereinafter.

Magnetic Signal Acquisition and Processing

The analogue values of the measured magnetic field vector provided by the uniaxial magnetic sensors 312X, 312Y, 312Z are sampled by the ADC 314 and piped or transferred into the processor module 304. The ADC 314 may be a 24-bit, 3-channel differential analogue-to-digital converter operating at a selected precise sampling rate (e.g., 250 Hz±2.5 ppm).

The digital values of the measured magnetic field vector at the marker location from the ADC 314 may be sent to the processor module 304 for decimation and storage. The processor module 304 may be configured for acquiring and processing the magnetic measurements from the magnetic field sensor 302. The processor module 304 may provide the following functions: power management, timing/clock generation, magnetic sensor resets, serial communication (for surface operation and/or debugging), etc. For testing and debugging, the processor module 304 may include configuration switches 322 and optical indicators 324.

The at least one computer processor in the processor module 304 may be a single microcontroller 320 (e.g., commercially available from Texas Instruments Inc). The microcontroller 320 may include a central processing unit (CPU) operating at 25 MHz with a hardware multiplier (e.g., to enable relatively sophisticated processes to be executed in reasonable time), 16 kibibytes (KiB) of random access memory (RAM) and 256 KiB of flash, timers, serial interfaces, analog-to-digital converters, and standard input/output (I/O) interfaces.

Figure 3D:
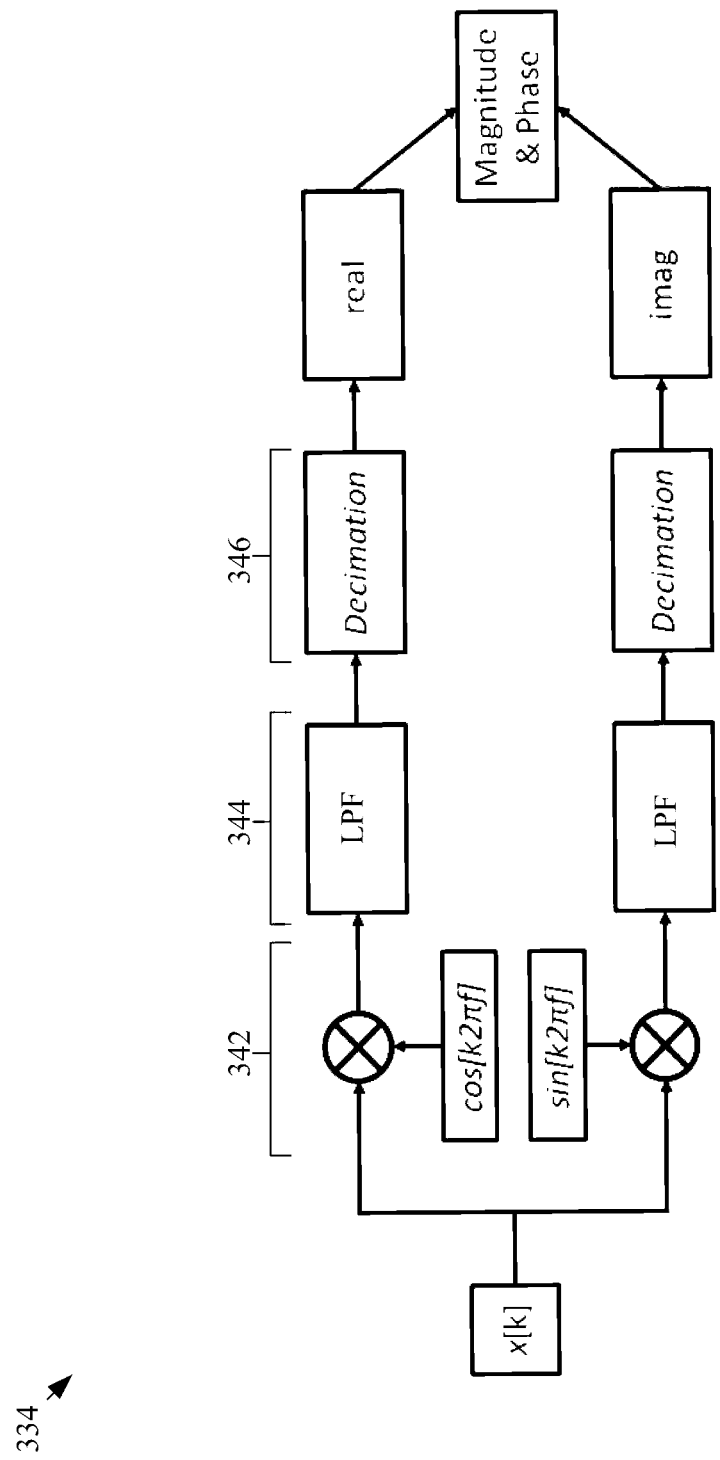
FIG. 3D is a block diagram of a demodulator of the marker.
Figure 3F:
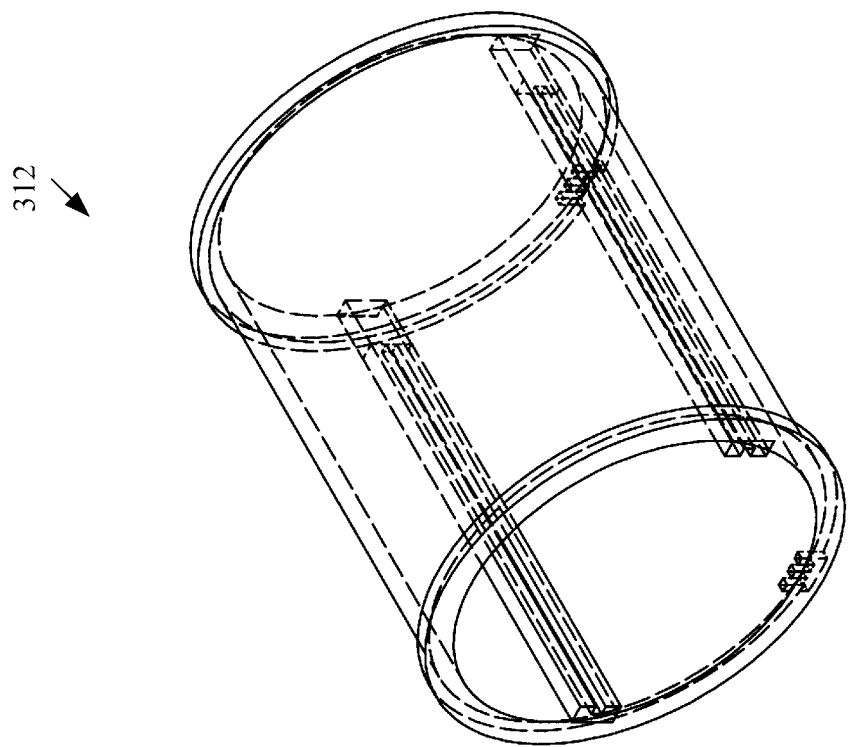
FIGS. 3E and 3F are drawings of perspective views of opposite ends of a housing of the marker.

The digital signal from the ADC 314 may be demodulated to baseband using a demodulator 334. The demodulator 334 includes a quadrature mixer 342, low-pass filters 344 and decimators 346, e.g., implemented as digital components, as shown in FIG. 3D. The demodulated signal included data representing a magnitude estimate and a phase estimate for a selected integration time (the selected time period depends on a selected window length used in the demodulator 334). Each of the measured signals (e.g., three measured signals for three dimensions) is processed to estimate a magnitude and a phase (these may be referred to as a "component magnitude" and "component phase"). Together, as a vector (e.g., a three-component vector), the magnetic signal can have an overall magnitude and a direction. The component phase information is used to determine if each signal is positive or negative with respect to the others, i.e., the phase of each of the measured signals may be the same as the others or shifted by 180 degrees. The demodulator 334 may require relatively accurate clocks driving both the MSS 200 and the acquisition system on the marker 300. These clocks may include crystal oscillators with accuracies of 2.5-5 parts per million (ppm) to ameliorate errors from clock drift during the demodulation.

The digital signals arriving at the demodulator 334 include the following two different types of signals:

the magnetic positioning signals, e.g., including a low-frequency (e.g., 5-10 Hz) measurement signal for which a very accurate estimate of magnitude and direction is made with a relatively long selected integration time in the demodulator 334;

the magnetic communications signals, e.g., including a higher carrier frequency (e.g., 31.25 Hz) for which a relatively shorter integration time may be selected in the demodulator 334.

For the magnetic positioning signals, the marker 300 demodulates the signal from the source using a simple downmix routine, then for measurement, generates estimates of the signal over suitable integration lengths, and generates statistical properties of the measurements of the signal (e.g., mean, variance, and trend). The trend (which may be referred to as the "linear trend" or "drift") is the linear change of an estimated value over the measurement time. The quadrature down-mixer 346 is used for the positioning signals. The marker 300 transmits measurement information representing the magnetic positioning signals to the controller system 116 using ERS 400: the controller system 116 performs calculations to generate location information representing the marker location by processing the measured amplitudes and phases.

For the magnetic communications signals, the marker downmixes, then filters and decimates to an appropriate baseband and decodes binary phase shift keyed symbols before extracting the Golay encoded payload and checking them using the CRC.

The processor component 304 includes a state machine that defines and changes a system state. The processor component 304 uses different demodulation techniques for the different types of signals based on the system state. Thus the processor component 304 effectively knows whether to expect a magnetic positioning signal or a magnetic communications signal based on the system state in the current step of the process.

The processor component 304 may be controlled by routines in the microcontroller 320, e.g., written using C/C++, and including modules with corresponding functions as listed in Table 1.

TABLE 1

| Module/Component | Function |
|---|---|
| BT_ADS1248 | Handles the ADC chip, controlling the sampling of the AMRs |
| BT_AMRProcessor | Processes sensor data via a regression algorithm to generate estimates of the magnetic field statistics (mean, variance, trend) |
| BT_Binary16 | Encodes/decodes the 16-bit floating point format |
| BT_Constants | Declares some useful constants |
| BT_DIP8 | For reading the values of the DIP switches |
| BT_Flash | General purpose flash memory read/write routines |
| BT_Globals | Declares global variables and objects |
| BT_HBridge | Performs transmitter functions such as sending a bit-stream to the H-Bridge, or determining the resonant frequency of the transmitter. |
| BT_LED | Controls the 8 programmable LEDs on the marker board |
| BT_LongSleepTimer | Calibrates the internal oscillator and contains the Interrupt Service Routine (ISR) for hibernating the marker for long periods of time in a low-power state |
| BT_MagCalibMatrix | Contains the sensor calibration matrix values and routines for calculating this matrix, including a row-echelon based inversion routine |
| BT_MagPacket | Encodes/decodes the low-frequency magnetic communication packets using Golay encoding and CRC calculation. |
| BT_Marker | Contains main marker execution routines and state variable declarations. Also includes clock/power management routines |
| BT_MarkerPacket | Contains declaration of the data packet sent to the RF receiver and associated routines (CRC calculation/checking) |
| BT_printf | Custom print routines for debugging |
| BT_PushButton | Code to poll and detect pushes on the two buttons on the marker |
| BT_RFPacketGenerator | Performs the LDPC encoding of the data packet to be sent to the RF receiver |
| BT_RS485 | Allows transmission and reception of binary data through the RS485 peripheral (UART) |
| BT_RealRTC | Class for keeping real time over longer periods |
| BT_RTC | Time-keeper for the marker, used in conjunction with a timer peripheral to control the sampling rate on the ADC |
| BT_SMSCommsProcessor | Performs the demodulation, filtering and symbol decoding of the magnetic source communications channel. |
| BT_SMSPayload | Defines the MSS payload format and contains code to extract the relevant fields. |
| BT_Storage | Contains the code to read-from and write-to the flash segments that store the calibration matrix |
| BT_Watchdog | Starts, stops and polls the watchdog timer |
| main.cpp | Contains ISR call-backs and global object declarations |

The main execution path of processor component 304 (e.g., "BT_Marker") may be defined as a series of functions. Upon start-up of the processor component 304, execution may pass to the marker process routine which configures the peripherals, I/O, clocks and power regulators for execution, before passing control to a sub-routine (e.g., based on the DIP-switch settings). Each of these sub-routines contains the entire execution loop for a given mode of operation (e.g., calibration, testing modes, or localization). These sub-routines instantiate any local digital objects required on the stack, or refer to globals, and may run in an endless loop until the marker is powered off or reset by the watchdog timer or the reset button.

Measurement Data Payload and Antenna Driver Control Signals: Encoding & Modulation The measurement data produced by each marker 300 includes the necessary measurement data for an accurate inversion calculation to be made by the controller system 116.

The marker 300 may encode a measurement data payload with a coding scheme and modulate this encoded data using a modulating scheme. The coding scheme may use low-density parity-check (LDPC) encoding, which may be computationally light-weight for the microprocessor 320, whilst also being efficient with respect to the theoretical maximum channel capacity. The modulating scheme may use binary phase-shift key (BPSK) modulation, which may be simple to perform with the microprocessor 320, and may still provide adequate channel capacity given the physical bandwidth (e.g., 500 Hz) of the EM signals transmitted by the transmit antenna 308.

The measurement data payload carried by the EM signals may include one or more of the following information:

statistical information of the field measurements in each direction ($B_x$, $B_y$ & $B_z$) for three orthogonal coil activations (X-coil, Y-coil & Z-coil), including statistical information such as mean, variance and trend;

a temperature measurement by the marker 300 (made using a temperature sensor of the marker 300), and/or a moisture measurement by the marker 300 (made using a moisture sensor of the marker 300 configured to measure moisture of the medium 104 at the marker location);

an "inversion" count representing how many times the magnetic field measurement has been made and transmitted;

values representing flags to indicate fault conditions;
the marker sequence number; and
the quasi-unique marker identifier (ID), e.g., a marker serial number.

In an example, the data payload may include the information listed in Table 2, where "bin16" is a reduced precision floating point format with about three decimal places of accuracy.

TABLE 2

| | | |
|---|---|---|
| uint16_t | m_seqNo; | // Sequence Number of Marker |
| bin16 | m_magXX; | // Mean estimate of X field for X excitation |
| bin16 | m_magYX; | // Mean estimate of Y field for X excitation |
| bin16 | m_magZX; | // Mean estimate of Z field for X excitation |
| bin16 | m_magXY; | // Mean estimate of X field for Y excitation |
| bin16 | m_magYY; | // Mean estimate of Y field for Y excitation |
| bin16 | m_magZY; | // Mean estimate of Z field for Y excitation |
| bin16 | m_magXZ; | // Mean estimate of X field for Z excitation |
| bin16 | m_magYZ; | // Mean estimate of Y field for Z excitation |
| bin16 | m_magZZ; | // Mean estimate of Z field for Z excitation |
| int8_t | m_trendXX; | // Trend estimate of X field for X excitation |
| int8_t | m_trendYX; | // Trend estimate of Y field for X excitation |
| int8_t | m_trendZX; | // Trend estimate of Z field for X excitation |
| int8_t | m_trendXY; | // Trend estimate of X field for Y excitation |
| int8_t | m_trendYY; | // Trend estimate of Y field for Y excitation |
| int8_t | m_trendZY; | // Trend estimate of Z field for Y excitation |
| int8_t | m_trendXZ; | // Trend estimate of X field for Z excitation |
| int8_t | m_trendYZ; | // Trend estimate of Y field for Z excitation |
| int8_t | m_trendZZ; | // Trend estimate of Z field for Z excitation |
| uint8_t | m_varX; | // Variance estimate of X/Y/Z field for X excitation |
| uint8_t | m_varY; | // Variance estimate of X/Y/Z field for Y excitation |
| uint8_t | m_varZ; | // Variance estimate of X/Y/Z field for Z excitation |
| int8_t | m_temp; | // Temperature of marker |
| int8_t | m_moist; | // Moisture at marker |
| uint8_t | m_flags; | // Flags register (Error codes) |
| uint16_t | m_serial; | // Serial number of marker |
| uint16_t | m_inversion; | // Inversion index (counts from 0 upwards for each inversion) |
| uint16_t | m_CRC16B1; | // CRC16 check for Block 1 |
| bin16 | m_varXXfp; | // Variance estimate of X field for X excitation |
| bin16 | m_varYXfp; | // Variance estimate of Y field for X excitation |
| bin16 | m_varZXfp; | // Variance estimate of Z field for X excitation |
| bin16 | m_varXYfp; | // Variance estimate of X field for Y excitation |
| bin16 | m_varYYfp; | // Variance estimate of Y field for Y excitation |
| bin16 | m_varZYfp; | // Variance estimate of Z field for Y excitation |
| bin16 | m_varXZfp; | // Variance estimate of X field for Z excitation |
| bin16 | m_varYZfp; | // Variance estimate of Y field for Z excitation |
| bin16 | m_varZZfp; | // Variance estimate of Z field for Z excitation |
| uint16_t | m_CRC16B2; | // CRC16 check for Block 2 |
| float | m_magXXfp; | // Mean estimate of X field for X excitation |
| float | m_magYXfp; | // Mean estimate of Y field for X excitation |
| float | m_magZXfp; | // Mean estimate of Z field for X excitation |
| float | m_magXYfp; | // Mean estimate of X field for Y excitation |
| float | m_magYYfp; | // Mean estimate of Y field for Y excitation |
| float | m_magZYfp; | // Mean estimate of Z field for Y excitation |
| float | m_magXZfp; | // Mean estimate of X field for Z excitation |
| float | m_magYZfp; | // Mean estimate of Y field for Z excitation |
| float | m_magZZfp; | // Mean estimate of Z field for Z excitation |
| bin16 | m_trendXXfp; | // Trend estimate of X field for X excitation |
| bin16 | m_trendYXfp; | // Trend estimate of Y field for X excitation |
| bin16 | m_trendZXfp; | // Trend estimate of Z field for X excitation |
| bin16 | m_trendXYfp; | // Trend estimate of X field for Y excitation |
| bin16 | m_trendYYfp; | // Trend estimate of Y field for Y excitation |
| bin16 | m_trendZYfp; | // Trend estimate of Z field for Y excitation |
| bin16 | m_trendXZfp; | // Trend estimate of X field for Z excitation |
| bin16 | m_trendYZfp; | // Trend estimate of Y field for Z excitation |
| bin16 | m_trendZZfp; | // Trend estimate of Z field for Z excitation |
| int8_t | m_tempX; | // Temperature measured during X measurement |
| int8_t | m_tempY; | // Temperature measured during Y measurement |
| int8_t | m_tempZ; | // Temperature measured during Z measurement |
| uint16_t | m_CRC16B3; | // CRC16 check for Block 3 |
| uint8_t | m_byte0; | // padding byte |

Additional data may be added to the measurement data payload based on the application area, and on other components which may be included in the marker 300, e.g., other sensor inputs (in addition to the temperature and moisture sensors). It may be possible to dispense with some of the statistical information, with only reduced precision measurement means transmitted, thus shrinking the required packet size and reducing the bit-rate, and hence increasing the range of the EM path 110.

In an example, the measurement data from three mutually orthogonal magnetic sensors may be represented by 3 LDPC packets, each 324 bits in length (972 bits total). With 324/648 LDPC coding and some other overheads, the total transmission may be 2072 symbols. At a symbol rate of 250 symbols/second, the transmission may be 8.288 seconds in length. If a guard-band, e.g., of 1.712 seconds, is selected to ensure marker transmissions do not overlap, there is a transmission window of 10 seconds. Each of the three LDPC blocks may have an associated 16 bit Cyclic Redundancy Check (CRC) code for verifying the data are correct. The first LDPC block may contain a low-precision subset of the required data for the inversion, while the second and third LDPC blocks may repeat this information at a higher precision. This redundancy provides the system 100 with the ability to estimate a position for a marker even if the last 2 LDPC blocks fail to decode correctly.

The measurement data payload is represented in control signals for the antenna driver 343 that are generated by the controller module 304 and sent to the transmit module 306. The control signals for the antenna driver 343 may be generated using a power controller 332 of the controller module 304, e.g., a hardware pulse width modulation (PWM) peripheral, connected to the microcontroller 320. In an example, the power controller 332 may provide a carrier frequency (e.g., around 30-60 kHz), and the microcontroller 320 may provide binary phase shift key (BPSK) modulation, e.g., with a symbol rate of 200-500 symbols/second, representing the information to be transmitted to the ERS 400.

Marker Transmitter

The EM transmitter module 306 is configured to generate EM signals for transmission to the ERS 400 along the EM communications path 110. The EM signals may be radio-frequency (RF) signals including RF frequencies. For TTE and mining applications, the EM signals may include low radio frequencies (RF), e.g., ultra-low frequencies (0.3-3 kHz), very-low frequencies (3-30 kHz) and/or low frequencies (30-300 kHz). For other applications, the EM signals may include very high radio frequencies (30-300 MHz), ultra-high frequencies (300 MHz to 3 GHz) and/or super-high frequencies (3 GHz to 30 GHz), e.g., including frequencies used by mobile/cellular telephony equipment. The RF transmission frequencies and the RF signals are selected, or tuned, based on properties of the medium 104: for example, a carrier frequency of about 40-70 kHz may be selected for TTE communications in mining applications. The actual operational frequency may differ from the nominal carrier frequency (e.g., by a fraction of the nominal frequency, such as 1% or 10%) based on the actual properties of the EM transmit antenna 308, e.g., for a coil antenna, manufacturing variations, temperature, surrounding medium properties (e.g. using the moisture measurement), and physical/mechanical properties of the marker 300. In general, lower carrier frequencies may provide better TTE penetration, although the carrier frequency must be sufficiently high to be detectable by the ERS 400. Based on the properties of the medium 104 (through which the path 110 passes), there may be an optimal carrier frequency (or range of frequencies) for a given set of these medium properties, selected to balance signal attenuation (attenuation due to the medium 104 generally increases as the carrier frequency goes up) with receiver sensitivity (receiver sensitivity generally falls as the carrier frequency goes down). For example, to transmit through rock up to 15 m thick to the ERS 400 50-100 m laterally displaced from the marker 300, frequencies in the 1-100 kHz range may be preferable, and in a mining application, e.g., for transmission of data from beneath a muck pile with conductivity of 50 mS·m$^{-1}$, resting upon a bench with conductivity of 10 mS·m$^{-1}$, the carrier frequency may be selected to be in the range 40-70 kHz.

The EM transmitter module 306 includes an antenna driver 343, e.g., an H-Bridge current driver device that is commercially available.

The antenna driver 343 is controlled by the marker controller module 304 to encode information into the EM signals by modulating the current and/or voltage to the EM transmit antenna 308. For example, the antenna driver 343 may encode the information by modulating the phase of a waveform driving the EM transmit antenna 308 based on the control signals (described hereinbefore).

To modulate the carrier, a UART module on the microcontroller 320 may be used. The UART module may take the communication bit string of the measurement payload and output it at a precise 250 bits per second on the modulate control signal. For an H-bridge current driver device, there is the pulse-width modulation (PWM) clock signal and a direction (DIR) signal: the carrier may be generated on the PWM signal (e.g., at about 50 kHz) and the carrier may be modulated by switching the direction signal (which inverts the carrier), e.g., the carrier signal may be XOR-mixed with the DIR signal to generate the binary phase shift keyed modulation on the carrier. By adjusting the length of the idle phase of the signal, the power of the drive signal may be controlled. The logic interface between the microcontroller 320 and the driver 343 may include a Complex Programmable Logic Device (CPLD) 347, e.g., clocked at 12.288 MHz, containing combinatorial logic mapping the event and modulation signals to internal signals (e.g., H-Bridge signals) which may be clocked out with appropriate delays via a state machine 348 to the driver 343.

As shown in FIG. 3B, the EM transmitter module 306 may include a Power Control 350 that isolates the antenna driver 342 (e.g., H-Bridge circuitry) from the battery power supply to reduce power usage when the EM transmitter module 306 is inactive (by themselves, the H-Bridges may draw a significant parasitic current even when not being driven).

In an example, the EM transmitter module 306 may have a power consumption in the order of 20 Watts, is limited to avoid excessive heat generation, a transmission frequency of 45-55 kHz, and negligible noise levels.

The EM transmit antenna 308 may include:
a conductive coil, with inherent inductance (L) and resistance (R); and
an electronic tuning component (e.g., a series tuning capacitor, "C") to control the antenna resonant frequency to be equal or close to the selected nominal EM transmission frequency.

In an example, the transmit antenna 308 may be formed by winding a copper wire into a multi-turn coil. The value of the electronic tuning component may be selected to achieve the desired resonant frequency. Example parameters and their corresponding values of the transmit antenna 308 may be as follows:

Coil diameter: 70 mm;
Coil length: 79 mm-85 mm;
Wire width: 0.5 mm;
Turns: 144-150;
Inductance: 903 µH-880 µH;
Resistance: 4.91 Ω;
Selected tuning component of capacitance: 11 nF;
Resonant Frequency: 46-53 kHz (or 50.504 kHz); and
Q factor: 60.

The resonant frequency of the transmit coil may vary from antenna to antenna and marker to marker, e.g., due to variation of the number of turns on the coil form, and variability in the tuning capacitor value. Accordingly, the EM transmitter module 306 may include a feedback monitor 344, e.g., a current sense amplifier, that is sampled by the processor module 304 to provide an estimate of a current operating frequency of the EM transmit antenna, e.g., based on the current flowing in the transmit coil. This estimate may be used to adjust the carrier frequency driving the driver 343 to keep the EM transmit antenna 308 operating at or close to the selected nominal operating frequency. The feedback monitor 344 may be useful for an EM transmit antenna 308 with a high quality (Q) factor which is sensitive to temperature, materials surrounding the coil and normal manufacturing variability. For such a variable transmitted carrier frequency, the ERS 400 may be configured to adjust its receiver antenna(s) based on the detected EM signals, as described hereinafter.

Marker Identifier (ID) and Sequence Number

The processor module 304 may access the ID of the marker 300, e.g., in its computer-readable memory, for sending the ID with the measurement data payload. Generally, the ID is represented as ID data, e.g., in a binary format, other data formats or analogue coding schemes may be used. The ID may be a serial number, e.g., probably a 16, 24 or 32 bit number that is unique to each marker.

The part sequence number of the marker 300 may be programmed into a plurality of the markers 300 prior to deployment and may dictate in which order the markers 300 transmit their measurement data payloads. The sequence number may thus be used as a marker ID for a selected group of markers 300. One implementation may use 5 bit sequence numbers programmed with DIP switches (for up to 32 markers), 8-10 bit numbers (for 256-1024 markers), or higher. The sequence number may be programmed via magnetic signalling or contact communications prior to deployment, e.g in the initialisation phase described hereinbefore.

Magnetic Field Sensor Calibration System

The marker 300 may include a calibration system to provide calibration for one or both of the following two aspects of the magnetic sensors 212: the directionality (orthogonality) of the sensors 212, and the sensitivity of the sensors 212. In alternative embodiments, this calibration system may be included in the controller system 116 instead of each marker 300 (so the markers could be calibrated for orthogonality on-site immediately prior to deployment and system activation); however, this would require matching of the signals from each direction-uncalibrated marker with a calibration matrix in the controller system 116, so having the calibration for each marker in that marker may be simpler.

The three sensors 212 may be mounted or arranged in the marker 300 in a nominally orthogonal orientation so that each sensor 212 is sensitive to a different Cartesian component of the applied magnetic field, to the exclusion of the others; however, slight differences in manufacturing and marker assembly may mean that the three sensors 212X, 212Y, 212Z are not perfectly orthogonal, e.g., errors in orthogonality may be about 1° between axes.

Nevertheless, despite being non-orthogonal, the three sensors 212X, 212Y, 212Z constitute a suitable basis for determining the true magnetic field vector with appropriate calibration techniques. The sensitivity of each sensor 212 is understood in terms of the voltage electrical signal (e.g., generated as a function of applied field. For the markers 300, this may be 1 to 10 nanoteslas per millivolt (nT/mV), e.g., approximately 2.3 nT/mV. However, each sensor 212 is slightly different due to manufacturing variations, and so the sensitivity also requires calibration.

For linear sensitivity, the calibration of each sensor 212 for orthogonality and sensitivity may be determined by applying a set of accurately known uniform fields, in three known directions (covering three dimensions), in a calibration process. By measuring the response of each sensor 212 to each of these three known fields, a compensation matrix can be generated.

The response of three linear magnetic sensors 212X, 212Y, 212Z to an applied field can be written as follows, $$\begin{bmatrix} V_X \\ V_Y \\ V_Z \end{bmatrix} = C \begin{bmatrix} B_X \\ B_Y \\ B_Z \end{bmatrix},$$

where $$\begin{bmatrix} V_X \\ V_Y \\ V_Z \end{bmatrix}$$

are the voltages measured on the output of each sensor, $$\begin{bmatrix} B_X \\ B_Y \\ B_Z \end{bmatrix}$$

is the applied magnetic field vector, and c is a 3×3 matrix that describes the combined response (in millivolts per nanotesla) of each sensor 212 to each component of the applied field B.

For example, if the sensitivity of the sensors were to be unity (1 nT/mV), and the three sensors were to be perfectly orthogonal, then:

$$\begin{bmatrix} V_X \\ V_Y \\ V_Z \end{bmatrix} = \begin{bmatrix} 1 & 0 & 0 \\ 0 & 1 & 0 \\ 0 & 0 & 1 \end{bmatrix} \begin{bmatrix} B_X \\ B_Y \\ B_Z \end{bmatrix}$$

The calibration of the marker, therefore, requires the estimation of the matrix, c, which would allow for the compensation of measurements by multiplying the measured voltages by the inverse of c, $$C^{-1} \begin{bmatrix} V_X \\ V_Y \\ V_Z \end{bmatrix} = \begin{bmatrix} B_X \\ B_Y \\ B_Z \end{bmatrix}$$

This may be achieved by applying three excitations of known fields, preferably approximately orthogonal to one another, and measuring the response of the three sensors to each:

$$\begin{bmatrix} V_X^X & V_X^Y & V_X^Z \\ V_Y^X & V_Y^Y & V_Y^Z \\ V_Z^X & V_Z^Y & V_Z^Z \end{bmatrix} = C \begin{bmatrix} B_X^X & B_X^Y & B_X^Z \\ B_Y^X & B_Y^Y & B_Y^Z \\ B_Z^X & B_Z^Y & B_Z^Z \end{bmatrix}$$

The matrix c can then be determined by taking the inverse of the applied field matrix.

$$\begin{bmatrix} V_X^X & V_X^Y & V_X^Z \\ V_Y^X & V_Y^Y & V_Y^Z \\ V_Z^X & V_Z^Y & V_Z^Z \end{bmatrix} \begin{bmatrix} B_X^X & B_X^Y & B_X^Z \\ B_Y^X & B_Y^Y & B_Y^Z \\ B_Z^X & B_Z^Y & B_Z^Z \end{bmatrix}^{-1} = C$$

Practically, the compensation matrix is thus found by taking the inverse of c:

$$C^{-1} = \begin{bmatrix} B_X^X & B_X^Y & B_X^Z \\ B_Y^X & B_Y^Y & B_Y^Z \\ B_Z^X & B_Z^Y & B_Z^Z \end{bmatrix} \begin{bmatrix} V_X^X & V_X^Y & V_X^Z \\ V_Y^X & V_Y^Y & V_Y^Z \\ V_Z^X & V_Z^Y & V_Z^Z \end{bmatrix}^{-1}$$

Because all measurements are AC-coupled, voltage offsets do not need to be considered in the calibration of the sensors.

For the calibration process, each marker 300 may be placed in the centre of a calibration coil set in a known orientation, and powered up in "calibration" mode (selected via DIP switch). In this mode, the marker 300 is constantly measuring the magnetic sensors and looking for a strong signal (which may be at a predefined frequency, e.g., 5 Hz) on one of the three sensors 212X, 212Y, 212Z.

Depending on which sensor 212 is registering the stronger signal, the marker 300 may assume one of three possible excitation fields, X, Y or Z, which are driven into the coil set by the operator. The marker 300 may then measure this applied field (e.g., for 30 seconds), and take the average of the signal to generate an estimate for V. It will repeat this, keeping only the previous average (e.g., over 30 seconds) until the operator switches the calibration coil set to another direction of excitation. At which point the marker 300 will detect that the strongest component has changed and begin a new measurement (e.g., for 30 seconds) for this direction.

Once all three directions have been detected and an average for each has been made, the marker 300 (optionally with external computing assistance) may generate the calibration matrix (following the matrix calculation above) and store it in on-board flash memory. At this point, the marker 300 may be referred to as "calibrated". The marker 300 may thus include a calibration system with the calibration matrix and computer-readable instructions that applies the calibration matrix to measurements made by the sensors.

The orientation of the marker 300 in the field for the calibration is not required to be precise, e.g., within a few degrees may be sufficient. The true orientation of the marker 300 (and hence its suite of 3 sensors) may be irrelevant because a slight mis-orientation of the marker 300 in the calibration coils merely causes a slight rotation of the calibration matrix. It is important that the marker be oriented approximately correctly, as the marker has hard-coded assumptions about the strength of each calibration field (which are all slightly different), and the system 100 may correct for the cross-axis effect, which assumes (or measures) a background geomagnetic field of a certain strength and orientation.

The marker 300 or the controller system 116 may include a cross-axis-effect compensator, as described hereinafter.

Marker Power Source & Marker Housing

The marker 300 may include a power source 310, e.g., a battery, for powering the other components of the marker 300. The magnetic field sensor 302 may require bipolar supplies with at least 6 V on each rail (12 V total). The transmit component 306 may require a similar voltage (12 V) with a current supply of at least 2 A. The batteries may be lithium polymer (LiPo) rechargeable batteries. The batteries may have a high energy density, may be able to provide a very large current, and may have a high cell voltage (e.g., 3.7 V). The batteries may have very little ferrous or conductive material that would absorb, reflect or distort the magnetic field at the marker location, and/or the EM signals transmitted by the marker 300.

The marker 300 may be stored and transported in a powered caddy with a plurality of other ones of the marker 300, to keep the markers 300 fully charged before deployment. The caddy system may also provide communications with the marker 300 to allow configuration prior to deployment, e.g., in the initialisation phase, via contact or contactless communications protocols built into the caddy.

Figure 3E:
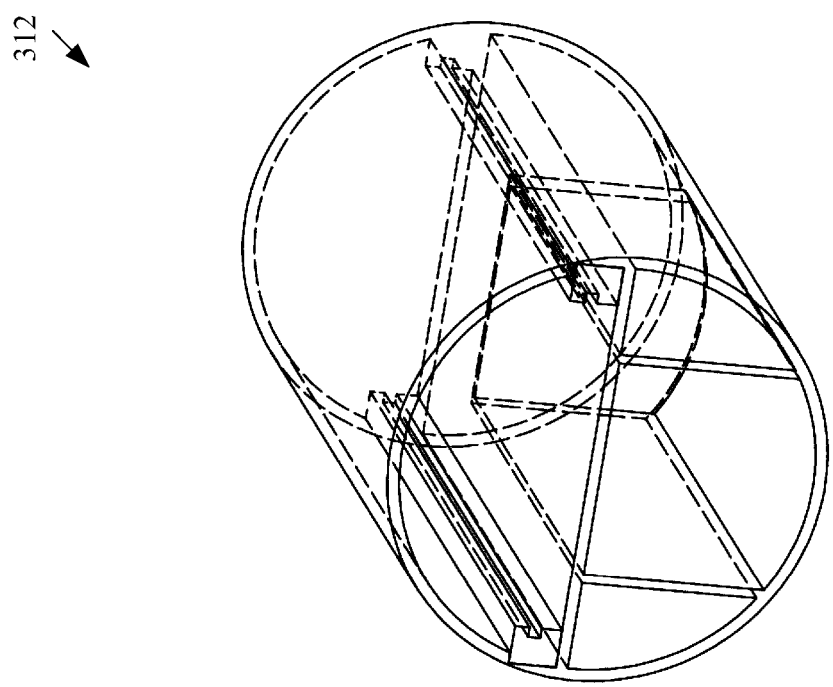

As shown in FIGS. 3A, 3D and 3E, the marker 300 includes a housing 313 around the modules 302, 304 and 306 to protect them mechanically. The housing 313 may include two pieces of cylindrical plastic shaped to be connected and sealed together. The housing 312 313 may mount and secure the modules 302, 304 and 306, e.g., on a printed circuit board (PCB), the power source 310 and the transmit antenna 308. The housing 313 may be manufactured with a 3D printer out of acrylonitrile butadiene styrene (ABS) plastic. For deployment, the marker 300 (including the housing 313) may be placed inside a sealed container with a removable nose cone, e.g., formed of plastic tubing. The marker 300 may include a tether 315 (e.g., a cable), connected to the housing 313, as shown in FIG. 3A, that allows the marker 300 to be suspended down a hole.

Electromagnetic Receiver System (ERS) 400

The ERS 400 receives the EM signals from the markers 300. The ERS 400 detects, demodulates and decodes the measurement data payload from the EM signals, and relays the data payload to the controller system 116 (which in turn uses the data payload to calculate the position of the marker 300).

Figure 4A:
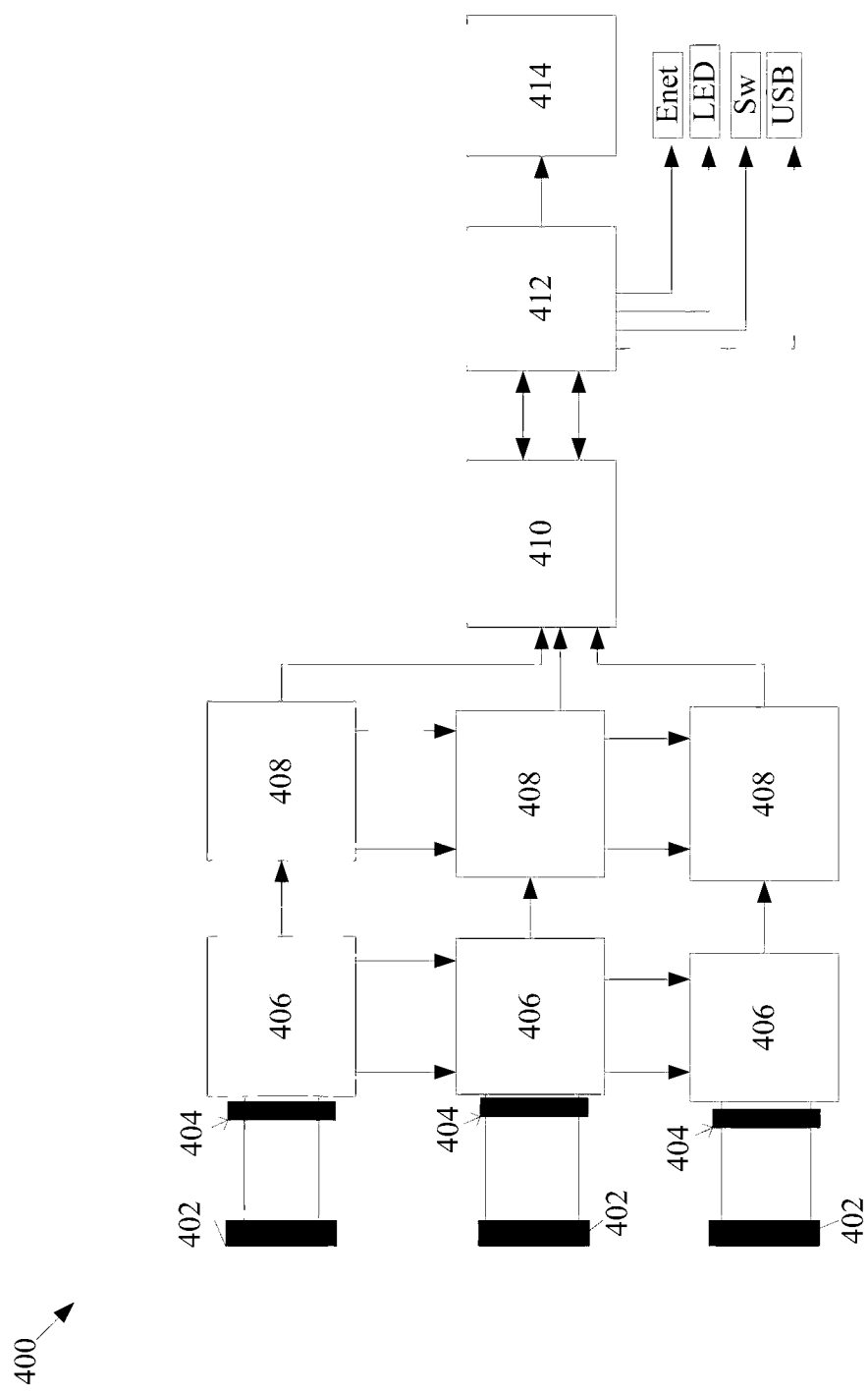
FIG. 4A is a block diagram of an electromagnetic receiver system (ERS) of the localisation system.

As shown in FIG. 4A, the ERS 400 includes a front end for each of three dimensions and each front end includes:
  a receive antenna 402;
  at least one band-pass filter 404 (e.g., to filter out frequencies not in the transmitted EM signals, e.g., 20-80 kHz);
  a low-noise amplifier (LNA) 406; and
  an analogue-to-digital convertor (ADC) 408.

The three antennas 402 are positioned orthogonally to one another to ensure a strong signal is received from each randomly oriented sub-surface marker 300. Each receive antenna 402 may be a 100-turn RF receiver coil with a crossed winding pattern used to minimize self-capacitance, e.g., a basket winding or honeycomb winding, which may ameliorate the receiver coil having a resonance of the EM signal frequency.

The three ADCs 408 may be connected to a field programmable gate array (FPGA) 410 which multiplexes the three digital outputs across a single bus to an Open Multimedia Applications Platform (OMAP) system 412. The OMAP is a system-on-a-chip (SOC) combining a general-purpose processor (e.g., 456 MHz) with a digital signal processor (DSP) which may be fast enough to decode the three channels simultaneously. The OMAP takes the digitized signals from the FPGA 410 and performs an ERS signal processing method 420 to recover the data payload. The signal processing steps include detection, demodulation and decoding. The OMAP 412 then transmits the recovered data payload to the controller system 116 using a output module 414 (e.g., a radio-frequency communications module, such as Zigbee™). The OMAP system 412 includes RAM, Ethernet and USB host adapters and Flash ROM. The External Memory Interface (EMIF) and Universal Parallel Port (UPP) are two of the available interconnects to transfer data from the FPGA into the DSP. The OMAP system 412 is a module that plugs into a system PCB containing the FPGA 410, ADCs 408, power regulators and other connectors/peripheral devices.

The ERS 400 includes an outer case around the LNA 406, the OMAP PCB and the power system with an internal rechargeable battery.

In an ERS process, once powered on and booted up, the ERS 400 simply listens continuously for marker transmissions. If one is detected, it is decoded and then transmitted e.g., via Zigbee™, to the controller system 116. The ERS 400 need not attempt any interpretation or validation of the data payload (beyond decoding the LDPC-encoded packets to their original payload), leaving the controller system 116 to determine if the packet was successfully decoded, and this may provide flexibility in that only the marker 300 and controller system 116 codebases need access to the structure, format and validation process of the marker data payload. The ERS 400 responds to Zigbee™ status request packets from the controller system 116, and when Zigbee™ communications have been established, the ERS 400 may send regular heartbeat status updates to the controller system 116.

Figure 4B:
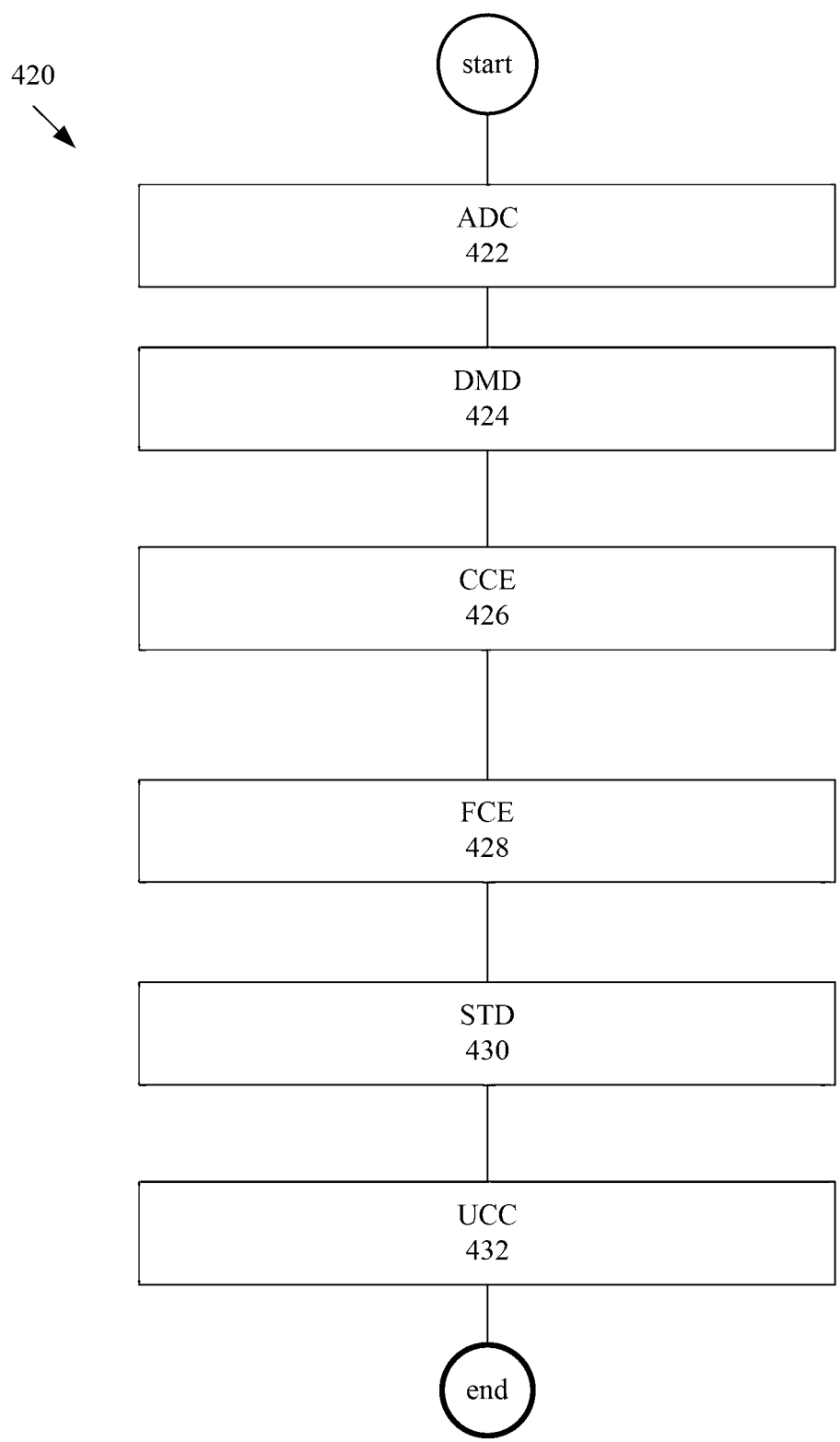
FIG. 4B is a flow chart of a processing method performed by the ERS.

The OMAP system 412 may contain a operating system (O/S), e.g., Linux, and a file system hosted on flash memory card. The ERS 400 includes computer-readable commands that run on the DSP device in the OMAP system 412. The computer-readable commands control the ERS 400 to perform the ERS processing method 420 (also referred to as a "processing pipeline"). As shown in FIG. 4B, the processing method 420 includes the following tasks (also referred to as "steps"):
- an analogue-to-digital conversion (ADC) task 422, including assembling the ADC samples (e.g., sampled at 312.5 kHz) in 5 ms blocks of data queued for the next processing stage;
- a De-Modulating and Decimate (DMD) task 424, including demodulating and 5-times sub-sampling to produce In-phase and Quadrature (IQ) data (e.g., at 62.5 KHz) queued for the next processing stage;
- a Coarse Carrier Estimation (CCE) task 426, including detecting a carrier on 8K IQ samples and applying frequency correction on the detected data, and 25 times sub-sampling for the next processing stage;
- a Fine Carrier Estimation (FCE) task 428, including applying an Inter-Symbol Interference (ISI) filter and estimating a finer frequency (−/+1 Hz) of the carrier, and deriving a signal-to-noise ratio (SNR) for the next processing stage;
- a Symbol Timing and Detection (STD) task 430, including detect a start of symbols with "sync" correlation, applying a phase correction and sub-sampling data for the next processing stage; and
- a User Console Communications (UCC) task 432, including performing LDPC decoding and communicating messages to the controller system 116 computer (e.g., with Zigbee™ packets).

Controller System 116

The controller system 116 may include a commercially available general-purpose computer (e.g., a laptop or personal computer) with a commercially available operating system (e.g., MS Windows™) and communications modules for communicating with the MSS 200 and the ERS 400 (e.g., a USB-connected Zigbee™ wireless unit). The controller system 116 may be located remotely from the MSS 200 and the ERS 400, or in some applications, in and with the MSS 200 and/or the ERS 400. The controller system 116 is configured to: (i) control the MSS 200; and (ii) receive and process the measured data payload from the ERS 400.

The controller system 116 establishes the parameters used in the measurement process and that initiates the broadcast of the magnetic signal to the markers 300. The controller system 116 may also transmit the data to other data centres or equipment, e.g., estimated marker locations may be provided to an excavator in a mining application to allow excavation of ore that is known to be present in a predetermined relationship with the markers 300, e.g., based on marker IDs of respective markers 300. Knowledge of marker location, and thus an ore body, may allow an operator to decide whether a given bucket load of rock is dispatched to the mill for processing or to the dump for long-term storage and redeployment.

The controller system 116 may be in communication with a plurality of the MSS 200 and/or a plurality of the ERS 400 to provide better coverage of a site with a plurality of the markers 300, some of which may be too remote from one of the MSSes 200 or one of the ERSes 400, but sufficiently close to another one in the pluralities so that necessary signals can be received by and transmitted from each marker 300. The plurality of the MSS 200 and/or the plurality of the ERS 400 may be distributed around a site with operation, e.g., timing of transmission and reception, coordinated by the shared controller system 116.

The controller system 116 establishes the location, orientation and disposition of the MSS 200 in a global or site coordinate system in order to provide the marker locations in that coordinate system.

The controller system 116 provides a human user interface (UI) to the system 100.

The functions of the controller system 116 include the following:
- performance of the inversion process (described hereinafter) to determine the marker location(s) from the measurement data payload(s);
- allowing configuration of the inversion process by a user (e.g., to set parameters including the basic geometry the system 100, and the number of markers 300);
- providing automatic discovery of the at least one MSS 200 and the at least one ERS 400;
- controlling the MSS 200 and ERS 400, including monitoring their statuses;
- processing of the measurement data as they arrive to generate and display the marker locations; and
- storage and retrieval of the measurement data and marker locations.

The marker 300 transmits measurement information representing the magnetic positioning signals to the controller system 116 using ERS 400: the controller system 116 performs calculations to generate location information representing the marker location by processing the measured amplitudes and phases. The controller system 116 may take into account information which is not present on the marker 300, e.g., strength and orientation of the Earth's field for cross-axis compensation. In alternative embodiments, if the markers 300 have sufficient processing speed and memory, the localisation may be performed in the markers 300.

Controller System Data Processing Modules

The measurement data payloads from the at least one ERS 400 are stored by the controller system 116, e.g., in comma-separated-value text-file format files. These files are then processed, e.g., using a first computer-readable command set (e.g., a Matlab™ script), to use the predetermined position and orientation of the MSS 200 source (e.g., entered manually by a user) to generate a collated data file that contains the estimated marker locations of the markers 300 in the frame of reference of the MSS 200. This collated file is then further processed, e.g., using a second computer-readable command set (e.g., a Matlab™ script), to perform cross-axis correction and to invert the measurement data to produce the location of the marker. Alternatively, instead of the computer-readable scripts, the processing steps could be implemented using computer code compiled from routines written in a programming language (e.g., C/C++™).

Figure 5:
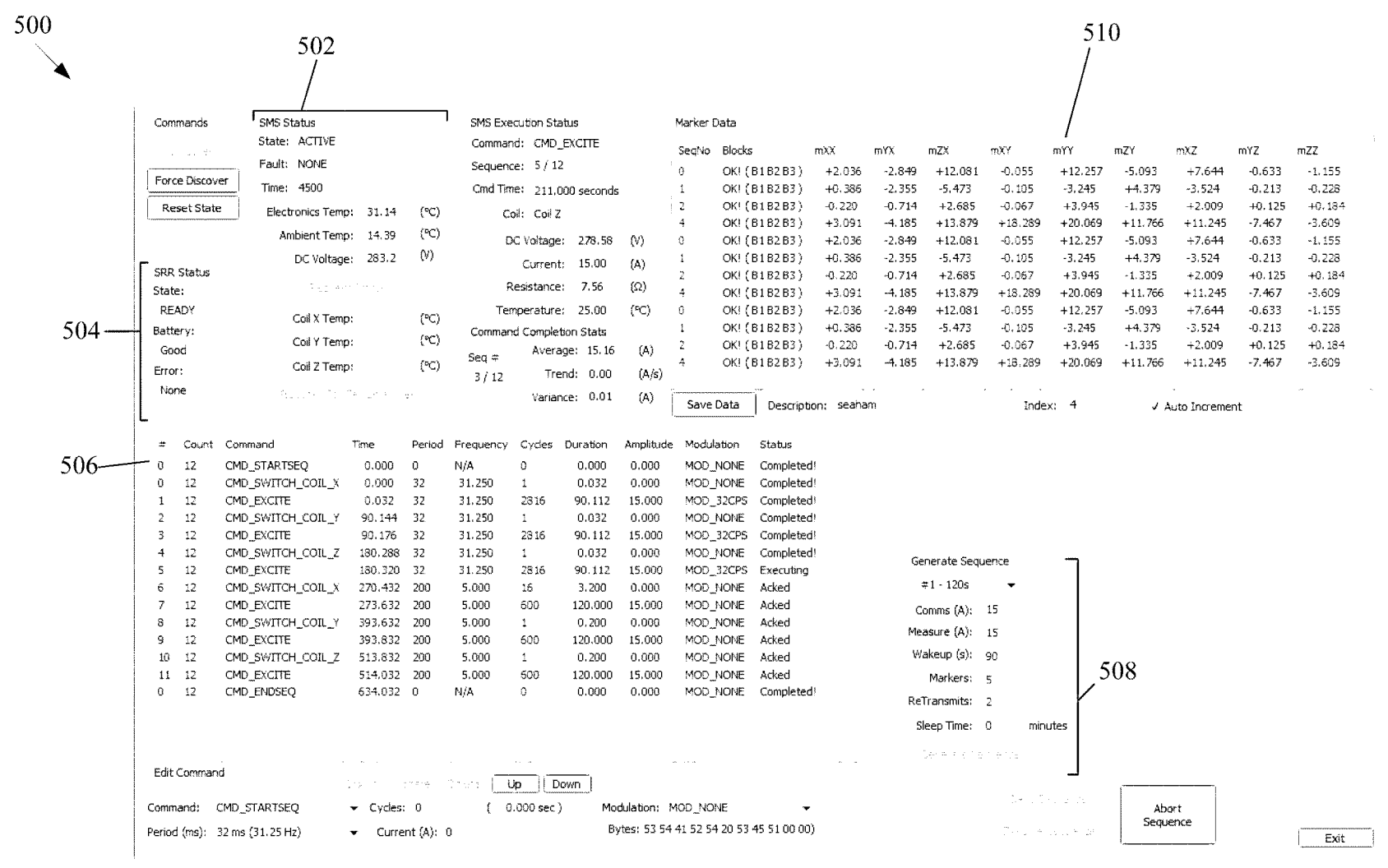

FIG. 5 depicts an example screen capture of a user interface (UI) 500 of the controller system 116 during operation. The status 502 of the MSS 200 ("SMS") and the status 504 of the ERS 400 ("SRR") are shown in the upper left of the UI 500. The UI 500 includes a command sequence list 506 with a sequence of excitation commands that the MSS 200 ("SMS") executes during the inversion process. The UI 500 includes a "generate sequence" control box 508 with which parameters to be specified and a suitable execution sequence generated. Once a sequence has been generated, the controller system 116 sends the sequence to the MSS 200, which confirms if a valid sequence has been received, after which there is a selected time window (e.g., 60 seconds) to initiate execution of that sequence by the system 100, thus beginning the inversion process. The UI 500 includes a marker data window showing marker data from a previous inversion: in the example of FIG. 5, the data from each marker 300 appears 3 times, indicating that the markers 300 were commanded to retransmit their measurements twice, although marker '3' was not active. The UI 500 may include a display of the sequence number of the marker 300, the validity of the CRC checks and the measured data (in nanoTesla).

The controller system 116 is configured by the computer-readable instructions to generate valid command sequences for the MSS 200 and the ERS 400, and to parse the data from the MSS 200 and ERS 400. The controller system 116 includes a state machine to manage the overall localisation process.

Cross-Axis-Effect Compensator

The cross-axis sensitivity modulation in the sensors 212 may cause significant errors. Cross-axis sensitivity modulation is the apparent change in the sensitivity of a sensor 212 when a cross-axis field is applied to it. For example a sensor oriented to respond to oscillating fields applied on the x-axis of the marker 300 would respond differently if a large DC field were to be applied in line with the y-axis (or z-axis). This modulation is generally linear, and manifests as a slight increase in sensitivity when the field is applied in one direction and a comparable decrease in sensitivity if the field is reversed. It also only affects one cross-axis direction (so in the example above, the cross axis effect is seen on either the y-axis or the z-axis, not both). In practice, the markers 300 operate within the Earth's background geomagnetic field, a large static field with a magnitude anywhere from 30 µT to 60 µT, depending on the location. Thus the direction and size of Earth's field with respect to the marker's sensors 212 may affect the measurement of smaller oscillating fields.

To compensate for the cross-axis effect, the background field must be known with respect to the local reference frame of the 3 sensors 212X, 212Y, 212Z. Once this is known, the impact on the sensitivity of the sensors 212X, 212Y, 212Z can be estimated, and the measured outputs from the three sensors 212X, 212Y, 212Z can be scaled to correct for this. For a DC-coupled magnetic field sensor, the Earth's static background field can be measured directly with the sensors in the correct frame of reference, and the sensor measurements of an AC field can be correctly compensated. Alternatively, a measurement of the geomagnetic field may be made with a source-based geomagnetic field sensor included in the MSS 200 to measure the geomagnetic field at the MFS 202: this source-based geomagnetic field sensor may be a 3-axis vector magnetometer, e.g., a DC-coupled fluxgate may be attached to the MFS 202 in a selected or known orientation.

When the uncompensated marker measurement data is returned to the controller system 116 and post-processed, an initial inversion may be made with the raw data. This provides an approximate location for the marker 300. Once this position is known, an estimate of the expected excitation field from the MFS 202 (in the coil set's frame of reference) can be made. By determining the rotation matrix that maps the expected excitation field to the one reported by the marker 300, the marker's orientation with respect to the MFS 202 can be estimated. This rotation matrix may be used to rotate the geomagnetic field measured in the reference frame of the MFS 202 to the marker's frame of reference. This now allows for the cross-axis compensation to be performed on the marker's measurements, and a refined estimate of the marker's position to be made. The marker 300 may thus include a cross-axis-effect compensator with scaling values for the magnetic sensors, and computer-readable instructions that apply the scaling values to measurements made by the sensors 212 to compensate for the cross-axis effect.

Alternative cross-axis-effect compensators may include one or more of the following:
  permanent attachment of a fluxgate to the MSS coil set that provides measurement signals for the controller system 116;
  a fluxgate-based in-situ reference frame and calibration surface unit which would also handle cross-axis compensation in addition to its other functions;
  a cross-axis-effect compensator in the marker 300, including DC-coupled sensor readout electronics on the marker 300, so that each marker 300 can compensate for the cross-axis effect before sending the measured data;
  closed-loop feedback electronics on the AMRs; and
  alternative magnetic sensors (AMR or otherwise) that do not exhibit this effect.

Localisation Method 600

The system 100, in operation, provides the localisation method 600, which can include localisation and tracking of the markers 300.

To localise the markers 300, the system 100 may poll each of the markers 300 sequentially (i.e., in series), or in parallel. The MSS 200 may broadcast globally to the markers 300 to awake them, then each marker 300 individually detects and records the generated magnetic field. The MSS 200 generates the magnetic signals for the markers 300 by generating the magnetic field B(t).

The MSS 200 can be regarded as a magnetic point dipole as the distances of the magnetic pathways 108 (thus the distances between the MSS 200 and the markers 300) are sufficiently larger than the size of the MSS 200, for example, based on a rule of thumb requiring 3 time the physical size of the dipole source, the coils are about 1.5 m in length/ width, and so the dipole approximation is good enough at about 5 m distance from the centre of these coils. Using magnetic dipole theory, the relative position of the magnetic field sensor 302, and thus the marker 300, with respect to the source of the MSS 200 may be determined from the amplitude information and the phase information of the magnetic components detected by the magnetic field sensor 302 using the inversion process.

Figure 6:
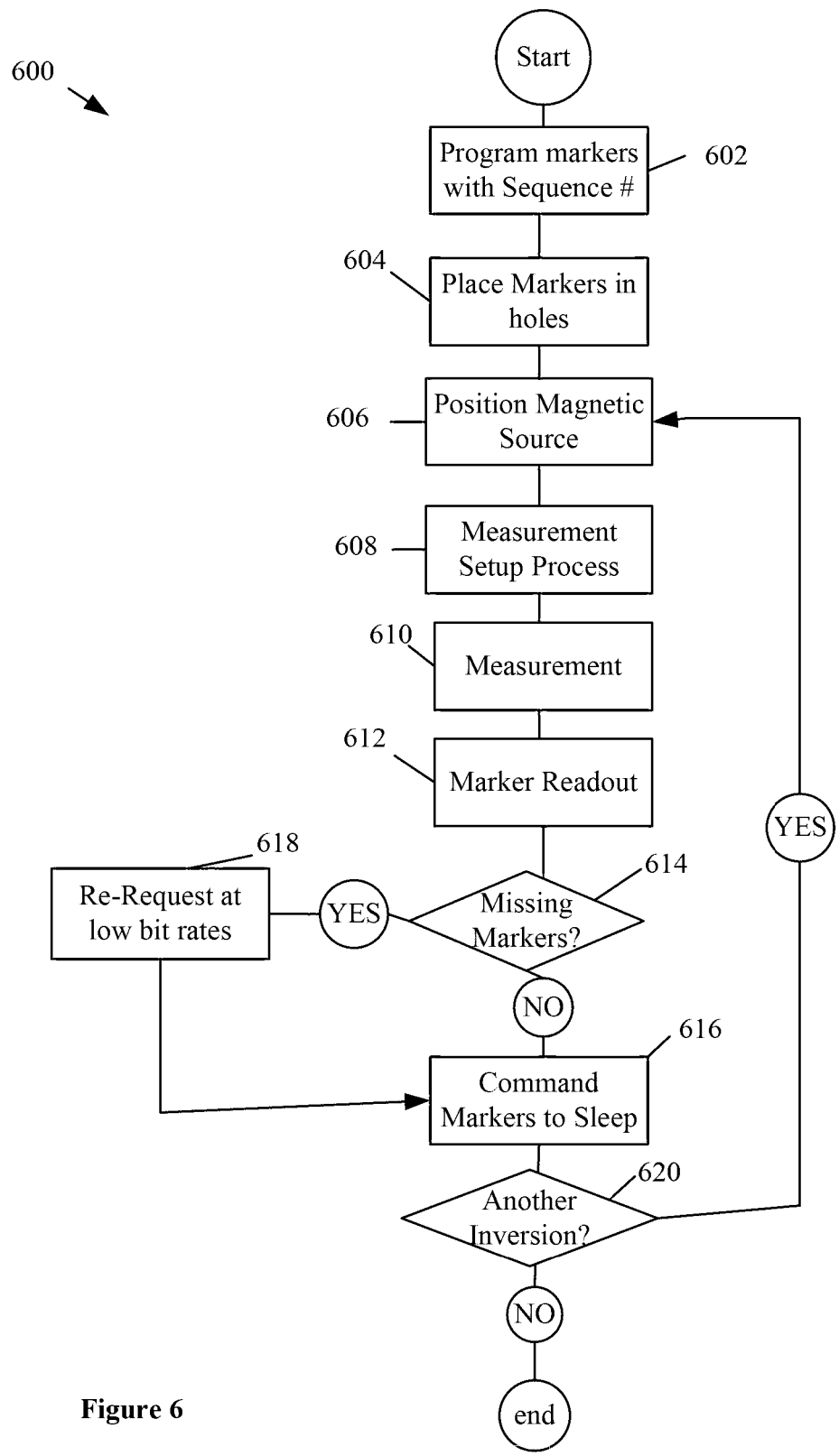
FIG. 6 is a flow chart of a localisation method performed by the localisation system.

As shown in FIG. 6, the localisation method 600 includes a step 602 of a marker activation process of the initialisation phase (described hereinbefore), in which the MSS 200 activates the markers 300, generally prior to deployment. The activation process in step 602 may include powering up the marker 300, configuring the marker 300 with a unique ID/sequence number, and placing the marker 300 into a low-power state ready for deployment; the sequence number of the markers 300 is used to control the order in which they transmit their measurement data payloads, and can be used as an address for each marker 300 in the system 100, e.g., the first marker may be given sequence number "0", and subsequent markers may be configured with consecutive sequence numbers. The low-power state for the marker 300 may be the standby mode, where the marker periodically wakes up (e.g., predefined as every 5-15 minutes) from a low-power mode (e.g., for a predefined time, e.g., for 10-15 seconds) to listen for the wake-up signal from the MSS 200. The low-power state may be the hibernate mode in which the marker 300 shuts down for a preselected length of time, before reverting to the standby mode. The hibernate mode may be useful for situations where the markers are configured off-site in step 602, and will not be placed in an application site for a known and extended period of time, e.g., two days later. The marker 300 may have enough battery capacity to remain in standby mode for up to 3-10 days, and in hibernate mode for 10-60 days. In hibernation mode, only the internal oscillator of the microprocessor 320 need be active, with the rest of the marker 300 shut down, and the marker could briefly wake up and check if it was time to come out of hibernation on a regular basis (e.g., every second), and thus level of power consumption may allow the marker 300 to stay in hibernation for almost 1 year. In a modified standby mode, the marker 300 may run a shortened 90 second sleep time between detections, in contrast to an ultra-short standby mode with only 10 seconds between detections. In standby mode, the microprocessor 320 may remain active and may regularly shut down the magnetic field sensor 302 and transmit module 306 to save power. In an experimental example, the markers 300 were able to remain active for 6 hours in standby mode, including performing up to 18 inversions.

The localisation method 600 includes a step 604 of placing the markers 300 at the selected marker locations in the medium 104, e.g., into witness holes in the ground. There may be no requirement for particular ones of the markers 300 be placed in particular pre-determined locations for their locations to be determined in the inversion process. When placed in their locations, the markers 300 may be in a low-power mode, e.g., the hibernate mode or the standby mode.

The localisation method 600 includes a step 606 of placing the MSS 200 and the ERS 400 adjacent the medium 104 at appropriate locations, and powering them up. The controller system 116 discovers the presence of the MSS 200 and the ERS 400 (or a plurality of either or both), and establishes communication links with them. The controller system 116 accesses or receives data from the MSS 200 representing the magnetic source location (in three dimensions) and the magnetic source orientation (relative to three orthogonal axes) in a global reference frame for the site of the system 100. Alternatively, or additionally the magnetic source location and orientation may be determined using sensors on the MSS 200. The magnetic source location and orientation may be determined using a plurality of the markers 300 placed in known or predetermined locations in the site's global reference frame (e.g., surveyed locations on the site): these locations may be referred to as anchor locations, and these ones of the markers 300 may be referred to as anchor markers.

The localisation method 600 includes a step 608 including a setup process, including configuring the controller system 116 with the operational parameters of the deployment. These parameters may include some geometry information (e.g., in which half-space the markers are with respect to the magnetic source), how many markers have been used, what excitation scheme is to be used, and optionally the initial position of these markers. In the setup process, the controller system 116 sends a series of commands to the MSS 200 that are queued, ready for execution. These commands describe the different excitation parameters for the coils of the MSS 200. The parameters include which coil to excite, the frequency to drive, the power level to drive, the length of time for the excitation and the bit-stream to modulate (if appropriate). The commands include an accurate timestamp which provides precise control over when the magnetic fields are generated and/or modulated by the MSS 200. The final command from the controller system 116 instructs the MSS 200 to begin executing the command queue. The setup process includes a wake-up phase, e.g., lasting 5-15 minutes, in which the MSS 200 transmits a series of data packets for the markers 300 to decode using the magnetic communications signals. Each packet may include a time field indicating when the measurement phase is due to commence with respect to the transmission of the specific packet. Because the markers 300 are in standby mode, and only listen for a few seconds every few minutes, the source needs to repeat this wake-up message for long enough to ensure all the markers will have heard it. Each data packet may be transmitted on a different coil, to reduce the duty cycle and minimize the heating of the coils. Once all the markers 300 have detected the wake-up signal, decoded the data packet and determined when the measurement phase will commence, they will have effectively synchronized their internal clocks. The setup process may include a warm-up phase (e.g., about 2 minutes) during which the active components of the markers 300 (e.g., the electronics) may reach a steady-state operating temperature, thus providing a buffer time that may to reduce the risk of component drift during the measurement phase.

The localisation method 600 includes a step 610 with the measurement phase, e.g., lasting about 3 to 15 minutes, where the MSS 200 is controlled to generated the magnetic localisation signals (e.g., for 5 minutes on each coil), and no data is encoded onto the magnetic signal (the magnetic localisation signals may thus be referred to as DC or static signals caused by DC or static magnetic fields). The markers 300 continuously measure the magnetic field during this phase, storing a series of data in internal memory representing the measurements. After the measurement phase concludes, the raw measured data may be post-processed to produce an average value, and some other relevant measurements may also be stored (e.g., the temperature measurement, the moisture measurement, signal noise, and/or linear trend). The markers 300 may perform a regression analysis process on single estimates of the signal strength and phase measured over a selected time period (e.g., 10-50 seconds, dependent on the length of the measurement phase selected), which may be more memory efficient than storing decimated data and post-processing.

The localisation method 600 includes a step 612 including a read-out phase. In the read-out phase, each marker 300 transforms the measurement data that has been collected and processed during the measurement phase into a predefined data format, along with other information (e.g., marker sequence number, marker serial number, etc.) and transmits the measurement data payload to the ERS 400. The ERS 400 acquires the measurement data payloads carried by the EM signals and relays them to the controller system 166. Each marker 300 may require approximately 10 seconds to transmit its data payload to the ERS 400, and each marker 300 may transmit in turn based on their sequence number, which effectively creates a time-domain multiplexed-access system, and relies on each marker 300 knowing its position in the sequence, and all the markers having their clocks synchronized. A short guard-band may be included in the EM transmissions to account for any clock drift among the markers 300. In an example, assuming 10 seconds to transmit, a 1 second guard band and 100 markers, the read-out phase would take approximately 19 minutes to complete. The markers 300 may be configured to repeat their transmissions (e.g., up to 7 times) for testing purposes, or to reduce errors in the system 100. In an example, the marker 300 required 8.288 seconds to transmit 3 LDPC-encoded data blocks, and the guard-band was selected such that the time between transmissions was 10 or 15 seconds.

The localisation method 600 includes a clean-up phase after the ERS 400 has relayed the measurement data payloads to the controller system 116. After transmitting the measurement data payload, the marker 300 listens for a short period for any further instructions, and then reverts to the standby mode until awakened for a further iteration of the inversion process (return to step 606). However, some of the measurement data may not have been collected properly during the read-out phase, e.g., because the marker 300 failed (e.g., was crushed during a blast), because the marker 300 never heard the wake-up signal and missed the measurement, or because the marker's EM transmission was corrupted due to a low signal-to-noise ratio. If nothing is heard by the ERS 400 from the marker 300 during its allotted time in the read-out phase, it may assume it is either non-functioning or has no useful data; however, if a corrupted payload was received, then the system 100 determines that there are missing markers 300 (step 614), and may re-request that missing data (step 618). Re-requesting the missing data can be performed by signalling (with the MSS 200) specifically to the marker 300 or markers 300 from which corrupted data was received, using the marker ID/s, requesting a re-transmission, e.g., at a slower data-rate (for example, half or quarter rate), that will improve the likelihood of correct reception. During the clean-up phase, the markers 300 listen for a short period for any retransmission requests: if one is received in the magnetic signalling, the marker 300 will check the sequence number in the address field to see if it matches its own. If it does, it will retransmit. In either case it will extend its listening period in case another request occurs that does match. This will continue until all requests have ceased, at which point the markers 300 will listen for a short period longer before resuming standby mode. At the end of the clean-up phase, the controller system 116 commands the MSS 200 to transmit a broadcast message instructing all of the markers 300 to enter hibernation mode for a specified time (in the magnetic communications signalling). This enables the markers 300 to save power if it is known there will not be a need to run another measurement phase for the known specified time.

In the localisation method 600, if it is determined in step 620 that a further measurement phase is required, the system 100 returns to step 606. Otherwise, the localisation method 600 ends. Once the measurement data have been received at the controller system 116, the marker location is estimated using a magnetic localisation process (referred to as the "inversion process"), described hereinafter.

After the localisation method 600, the system 100 may deliver the determined marker positions to other systems (e.g., to excavation equipment working on a mine site), or to visualisation tools (e.g., computer packages that map the site features in 3D and can additionally display the determined/estimated marker locations). The controller system 116 may generate and display, e.g., on a computer screen using (Matlab™-generated) computer code: the estimated marker locations for each iteration of the measurement phase; movement vectors for individual ones of the markers 300 (e.g., identified by marker IDs) based on marker locations from a plurality of iterations of the measurement phase; and representations of the accuracy with which the marker locations have been estimated (e.g., an accuracy measure for each location estimate based on the measured statistical properties). A plurality of iterations of the measurement phase may be performed with the markers 300 in the same locations, but with the MSS 200 in a corresponding plurality of locations: each iteration of the measurement phase may generate an independent estimate of the marker locations, and combining a plurality of location estimates for each marker 300 (e.g., identified by marker IDs) may increase the accuracy measure for each location estimate, e.g., based on statistical combinations of the accuracy measures for each of the plurality of independent location estimates for each marker location.

Inversion Process

A magnetic dipole is defined by a single vector which indicates its direction and magnitude, which is the magnetic moment, measured in ampere-metres squared (A·m²). The position of the remote 3-axis magnetic field sensor 302 may be determined with respect to the stationary, magnetic source with a controllable magnetic moment (in 3 orthogonal directions) by the following equations:

$$S = E_o \cdot E_i^{-1}$$

$$U = S^t \cdot S$$

$$k = \sqrt{\frac{tr(U)}{6}}$$

$$M = \frac{1}{k} S$$

$$X = \frac{M \cdot M - I}{3}$$

$$X = \begin{bmatrix} \cos^2\alpha\cos^2\beta & \cos\alpha\sin\alpha\cos^2\beta & -\cos\alpha\sin\beta\cos\beta \\ \cos\alpha\sin\alpha\cos^2\beta & \sin^2\alpha\cos^2\beta & -\sin\alpha\sin\beta\cos\beta \\ -\cos\alpha\sin\beta\cos\beta & -\sin\alpha\sin\beta\cos\beta & \sin^2\beta \end{bmatrix}$$

where,

Ei is a 3 by N matrix describing the dipole source signal at N points in time;

Eo is a 3 by N matrix describing the 3-axis magnetic field sensor measurement signal, corresponding to the dipole field described by Ei at N points in time;

S is the system-matrix that describes the relative geometry of the sensor with respect to the source (orientation and position);

U is independent of the orientation of the 3-axis magnetic field sensor with respect to the source;

k describes the attenuation factor for the field, which is directly related to the distance (r) of the magnetic field sensor from the source;

M is a distant-invariant measure of S;

I is the 3 by 3 identity matrix; and

X is a matrix which is defined completely in terms of the inclination/azimuth angles of the magnetic field sensor's position with respect to the source.

Thus with the known source signal (Ei), and the measured field signal (Eo) at the remote 3-axis magnetic field sensor, the distance (r), inclination (β or I), and azimuth (α or phi (φ) can be determined. With these three parameters, the position of the magnetic field sensor 302 with respect to the source (centre of the MFS 202) can be determined.

There is a sign ambiguity in the inclination and azimuth terms of the X matrix which is addressed using the parameter value setting that the magnetic field sensor is either 'in front of' (α~[−90, 90]) or 'behind' (α~[90, 270]) the source, or that the magnetic field sensor is 'above' (β>0) or 'below' (β<0) the x-y plane of the source as described hereinbefore. The orientation of the 3-axis magnetic field sensor can be arbitrary. The magnetic source dipole signal (Ei) may contain magnetic moments oriented in all three orthogonal directions.

If the source is excited sinusoidally for a period of time in turn, the excitation/response matrices can be described as follows:

$$E_i = \begin{bmatrix} M_X & 0 & 0 \\ 0 & M_Y & 0 \\ 0 & 0 & M_Z \end{bmatrix}$$

$$E_o = \begin{bmatrix} X_x & Y_x & Z_x \\ X_y & Y_y & Z_y \\ X_z & Y_z & Z_z \end{bmatrix}$$

where $M_X$, $M_Y$ and $M_Z$ refer to the magnitude of the magnetic moments of direction; X, Y, Z refer to the magnitude of the sinusoidal signal acquired when the x, y, z coil was active, respectively, and the subscripts x, y, z refer to the field components measured by the 3 axes of the magnetic field sensor, respectively.

The magnitude and direction of the magnetic moments produced by the MSS 200 can be estimated or determined based on the area of the loop, number of turns and current driven through them, or based on measurements of the magnetic field at the magnetic source (e.g., using a calibrated, low-noise 3-axis magnetometer placed in several surveyed positions around the MSS 200 to measure the fields produced by the magnetic source). Data representing the measured source field may be processed to generate estimates of the measurement matrix Eo and these may be inverted using the estimated Ei matrix. An error term may be derived based on the surveyed position of the fluxgate and this term may be minimized using an iterative linear search of the {MX, MY, MZ} parameter space, varying each parameter by ±10%. The direction of the moments may be estimated/determined in a similar process.

Simply using the extracted tracking angles β and α may result in larger errors for certain positions of the magnetic field sensor 302 in the source's frame of reference: in particular, with large (|β|>70°) inclination angles and/or azimuth angles near 0° or 90°, the absolute error due to noisy sensors may increase dramatically. This increase in the positional error is dominated by the choice of the coordinate system and reference frame, and may be ameliorated by: rotating the reference frame of the excitation matrix (Ei) to a more optimal position, solving for the tracking angles, producing the corresponding Cartesian coordinates then applying the inverse of the rotation applied to the excitation matrix to rotate the position back to the original frame of reference. This may be achieved by making an initial estimate of the tracking angles, using the above steps, then using these initial estimates to rotate the reference frame, e.g., to β=α=10°, then re-estimating the new tracking angles.

The numerical inversion process may be performed using computer-readable code, e.g., generated from a Matlab™ file.

There may be a need to transform the coil-set's frame of reference to a known frame of reference (e.g., of a mine site), for each inversion, such that the positions of the markers can be related to the known frame of reference. To transform the reference frame, three survey reflectors may be attached to the MSS 200 (e.g., on the coil-set), and the survey reflectors may be used to define a Cartesian coordinate system that represents an approximation to the coil-set's frame of reference. To do this, the vector between 'A' and 'B' (AB) is assumed to be parallel to the x-axis of the coil-set. This vector (AB) and the vector between 'B' and 'C' (BC) may define the x-z plane. Therefore, the cross-product of these two vectors may be used to calculate a vector parallel to the y-axis of the coil-set. A second cross-product between AB and the y-axis vector may be calculated to define the z-axis. This may now define the three orthogonal basis vectors for the coil-set's frame of reference. The final operation may determine the origin of the coil-set by averaging the lengths of the vectors AB and BC, and estimating the position of the origin from each of the three points assuming they were in the corner of a cube with sides of this length, centred about that origin. The three estimates of the origin may then be averaged. With the orthogonal basis vectors and an estimate of the location of the coil-set's origin, a transformation from the coil-set's frame of reference to that of the surveying equipment's may be performed. The transformation matrix for the coil-set may be may be performed using computer-readable code, e.g., generated from a Matlab™ file.

Applications

The medium 104 can be referred to as "complex", heterogeneous or non-homogeneous because the medium 104 may consist of a plurality of materials with different physical properties in terms of its mechanical, electrical and magnetic behaviour that may influence the extent of robust and effective transmission at the frequencies of operation of the magnetic source 102 and/or the ERS 400, and consequently the medium 104 includes boundaries between the different constituent materials.

Despite the heterogeneous nature of the medium 104, it has on average a sufficiently low relative permeability and conductivity to allow substantial transmission of the magnetic signals from the MSS 200 to the markers along the magnetic pathways 108 in the selected region of the medium 104 extending between the MSS 200 and respective ones of the markers 300.

The relative magnetic permeability (relative to the magnetic permeability of a vacuum), if high, may result in a distorted (not necessarily reduced) magnetic field at the marker 300, corrupting the inversion process (which assumes an ideal dipole source in free space). This characteristic does not necessarily degrade the return link communications (along the EM path 110) and in some cases may actually boost it. A relative permeability of 1 may be assumed for most TTE applications, although not necessarily for iron/nickel/manganese deposits. The conductivity, if high, may cause eddy-current losses in the medium 104, and may both reduce the magnetic field strength and distort it. The conductivity may affect both the magnetic paths 108 and the EM paths 110, but may be of more concern for the EM paths 110 because conductivity is generally frequency dependent, and the EM paths 110 may use signals with higher frequencies (e.g., 1-10,000 times higher) than the frequencies of the magnetic paths 108. The inversion process may assume zero conductivity, or up to about 10 milli Siemens per metre (mS/m).

The location, structure, characteristics and properties of the medium 104 can change over time, thus the medium 104 may be referred to as a "dynamic medium". For example, an event may trigger movement of the medium. The motion may be very, very slow (e.g., geological movement), or in short bursts (e.g., blasting). Movement of the markers 300 may be determined from iterations of the localisation process for different positions of the markers 300 over time, e.g., between blasts, or periodically over time. In examples, the localisation process may take some minutes to be completed, so the markers 300 would be considered to be static or motionless during this time. The movement can be ensemble movement and/or internal movement. In ensemble movement, the medium 104 moves relative to the MSS 200 and the RF receiver system, and thus the markers 300 do not necessarily move relative to each other. In internal movement, the structures and materials in the medium 104 move relative to each other, and thus the markers 300 move relative to each other due to the internal movement of the medium 104. An example of relative movement could be movement of an example medium comprising a rock feed in an ore recovery operation. An example of an internal movement could be re-arrangement of an example medium due to a disruption event, e.g., blasting of a rock body in mining.

Apart from the ensemble movement and internal movement, the medium 104 may change its properties due to disruption events: an example disruption event may be a blast that modifies the nature and distribution of components in the medium 104, e.g., rock components such as fragmented rock, pores, cracks, voids, water (e.g., water percolation along rock components and/or within porous rock), and regions of different materials. Changes in the medium 104 may not affect the localisation system 100, so long as the necessary signals can still be transmitted through the medium 104.

The medium 104 can include different types of structures and materials depending on the field of application. In general, the relevant applications include situations where there is restricted access to the medium 104 and to the objects in the medium 104. The restricted access means that the locations of the markers 300 may not be detectable using conventional technologies, e.g., signals from the global positioning system (GPS).

The medium may include any one or more of the following, based on the application:
  in civil engineering, demolition, construction or rescue applications, the medium may include natural materials (e.g., sediment, soil, ice, snow, sand, rock, etc.), which may prone to movement (e.g., in landslides, avalanches, mud slides, slips, sinkholes, etc.), and building materials (e.g., wood, brick, concrete, or other manufactured construction materials);
  in exploration, mining, and associated transporting applications—e.g., drilling for ore or hydrocarbons, surface mining (including open-cut mining, open-pit mining, strip mining, quarrying, auger mining, highwall mining, excavating, etc.), underground mining (including block-cave mining, or block caving, longwall mining, room-and-pillar mining, blast mining, cut and fill, drift and fill, shrinkage stoping, etc.), dredging, trucking, hauling, shipping, to processing of extracted geological materials—the medium 104 may include underground materials, e.g.: one or more rock bodies, earth and rock found in open-cut mines, quarries and excavations, fluids (i.e., gases and/or liquids), broken rock including ore, slurries, etc.;
  in waste processing applications, the medium 104 can include a mixture of fluids and solids, e.g., domestic and industrial rubbish, sewage, or industrial waste, provided the conductivity is acceptably low and relative magnetic permeability is close to unity;
  in geophysical monitoring applications, the medium 104 can include rock walls, water, ice and snow, e.g., in snow falls, rock falls and glaciers, and the markers 300 can be used to monitor: large-scale movement (greater than 0.5 metres), or movement behind a potentially stable front-surface (e.g., instead of using a wall-facing radar system);
  in civil engineering and demolition applications, the medium 104 may include man-made materials and structures, e.g., a dam, a building with a roof, ceiling, walls, floors, furniture, furnishings, office equipment, warehouse equipment, staircases, and insulation, and the markers 300 can be used to track movement of such structures provided the conductivity is acceptably low and relative permeability is close to unity;
  in personal recovery applications, the medium 104 may include earthquake rubble or avalanche debris, and the markers 300 can be used to locate and track buried persons or equipment.

A rock body may be a mixture of rock and soil, including air gaps, pores, cracks on all scales (i.e., of differing sizes), voids, water and different mineralogy.

The markers 300 may be associated with, connected to and/or integrated with other objects to form an marker apparatus, e.g., any one or more of the following:
  explosive devices (e.g., detonators, or explosive initiators);
  a hybrid combination of any two of a detonator, an initiator, a booster, and an explosive, where the object is in a body of rock, and where a mine operator desires to determine a location of the example marker apparatus before and/or after blasting the rock (e.g., to confirm positions of the objects prior to the blast);
  equipment (e.g., drill bits or drill strings); and
  persons (e.g., miners).

In a mining application, the localisation method 600 may be performed before blasting an ore body and after blasting the ore body. Before blasting, once all the markers 300 have been located, they can be sent a command to hibernate for a selected fixed period (based on the expected blast timing), or remain in standby mode. After the blast, the MSS 200 and the ERS 400 can be redeployed and the localisation method 600 repeated. By repeating the localisation method 600, the movements of the markers 300 can be tracked. The markers 300 may contain enough battery capacity for up to 10 inversions to occur over a 120-240 hour period, assuming standby mode is used instead of hibernate mode. In a mining application, this provides the capability to track the marker positions at various stages of an excavation process, in addition to the blast movement.

In an example, the markers 300 may be buried at selected start locations of geological interest (e.g., at or close to a boundary between valuable ore and subgrade material, i.e., the zone between economic ore and sub-economic ore) in a rock body in a blast zone of a mining site (i.e., the medium 104 starts as the rock body in the blast zone), and the system 100 can localise and track the 3D locations of the markers 300 before, and after blasting of the rock (including directly after the blast, and during excavation, transport and processing of the medium 104). In an experimental example, examples of the markers 300, referred to as "targets", were placed in an example of the medium 104 in the form of a rock and soil body. Some targets were placed in boreholes in a blasting zone, and other targets were placed in shallow boreholes and backfilled (for protection) on a bench floor adjacent the blasting zone so that the targets were covered by blast rock after the blast. The example medium included relatively solid rock before the blast, and broken rock (which can be referred to as "muck pile") after the blast. The example magnetic source transmitted for about 15 to 20 minutes, and the data collection by the example ERS lasted for the same amount of time. The data collection was repeated about 5 to 20 times over about 3 to 6 hours.

For person-tracking applications, e.g., rescue in an earthquake or avalanche situation, the markers 300 may be based on commercially available mobile/cell telephone devices, using EM transmitters and/or magnetic sensors in the telephone devices (the magnetic sensors may be more sensitive than magnetic sensors available in current commercial telephones, for example magnetoresistive sensors in iPhones™ from Apple Inc.). These markers 300 may use available electrical power and microprocessors in the telephone devices, under control of computer-readable code in electronic memory of the telephone devices. The EM frequencies for the EM link 110 may lie between 100 and 1000 MHz, or between 0.3 and 3 GHz.

The objects preferably have low conductivity and magnetic permeability to ameliorate distortion of the magnetic and electromagnetic signals. The objects preferably do not generate oscillating electromagnetic at the frequencies of operation of the system 100, strong magnetic fields (e.g., above the Earth's field) that saturate the sensors in the system 100.

Interpretation

The term "connected" can mean directly connected or indirectly connected, and in relation to electronic electrical connections, can mean indirectly connected to provide electrical or electronic communications between the connected portions. For example, the magnetic field sensor 302 is "connected to" the processor component 304 in the sense that the processor component 304 is able to receive communication signals from the magnetic field sensor 302 using a communications pathway, e.g., an electronic connection, a data connection, and optical connection, a short-range wireless connection, etc.

Many modifications will be apparent to those skilled in the art without departing from the scope of the present invention.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

The invention claimed is:

1. A marker for remote localisation in a medium including geological or building materials, the marker including:
   a housing for mechanically protecting the marker when embedded in the geological or building materials;
   a magnetic field sensor in the housing configured to measure three different magnetic fields at three different respective times in three dimensions at a marker location at three different respective orientations in the geological or building materials, wherein the marker is configured to generate measurement data representing the measured magnetic fields for determining the marker location when the three different magnetic fields are generated at the three different respective times with three different respective orientations by a magnetic source system (MSS) located outside the geological or building materials; and
   a chargeable power source in the housing for powering the magnetic field sensor.

2. The marker of claim 1, wherein the magnetic field sensor includes three magnetic sensors for the three dimensions.

3. The marker of claim 2, wherein the three magnetic sensors are aligned such that two of the three magnetic sensors are not parallel and such that the three magnetic sensors are not coplanar.

4. The marker of claim 1, wherein the marker includes a nulling system to reduce measurements of the Earth's magnetic field from the measured magnetic field.

5. The marker of claim 1, wherein the marker includes:
   a temperature sensor configured to measure the temperature of the magnetic field sensor; and/or
   a moisture sensor configured to measure moisture of the medium at the marker location.

6. The marker of claim 1, wherein the marker includes a compensator to compensate for:
   manufacturing variations in the magnetic sensors; and/or
   temperature fluctuations experienced by the magnetic field sensor.

7. The marker of claim 1, wherein the marker includes a calibration system for correcting non-orthogonal orientations of the magnetic sensors.

8. The marker of claim 1, wherein the marker includes a cross-axis-effect compensator to compensate for cross-axis effects in the magnetic sensors.

9. The marker of claim 1, wherein the measured magnetic fields represent magnetic positioning signals, and the marker is configured to generate the measurement data from the magnetic positioning signals.

10. The marker of claim 9, wherein the magnetic positioning signals are modulated at a frequency between 1 Hz and 40 Hz.

11. The marker of claim 9, wherein the marker is configured to determine statistical properties of the magnetic positioning signals, including a mean, a variance and/or a trend.

12. The marker of claim 1, wherein the geological or building materials from:
a heterogeneous medium; and
a low-magnetic-permeability low-conductivity medium.

13. The marker of claim 1, including:
an electromagnetic transmitter configured to transmit, through the geological or building materials, a wireless electromagnetic signal representing the measurement data.

14. The marker of claim 13, wherein the marker is configured to:
encode the measurement data to form encoded data; and
modulate the encoded data to form the electromagnetic signal.

15. The marker of claim 1, wherein the housing mechanically protects the magnetic field sensor and the chargeable power source during blasting of the medium in which the marker is embedded.

16. A method for remote localisation in a medium including geological or building materials, the method including:
generating three different magnetic fields at three different respective times in three dimensions with three different respective orientations outside the geological or building materials;
using a magnetic field sensor, measuring the three different magnetic fields at the three different respective times in the three dimensions at a marker location at three different respective orientations in the geological or building materials;
generating measurement data representing the measured magnetic fields for determining the marker location;
using a chargeable power source, powering the magnetic field sensor; and
mechanically protecting the magnetic field sensor and the chargeable power source in the geological or building materials with a housing around the magnetic field sensor and the chargeable power source.

17. The method of claim 16, including reducing or removing measurements of the Earth's magnetic field from the measured magnetic field.

18. The method of claim 16, including:
measuring a temperature of the magnetic field sensor; and/or
measuring moisture of the medium at the marker location.

19. The method of claim 16, including:
compensating for manufacturing variations in the magnetic sensors; and/or
compensating for temperature fluctuations experienced by the magnetic field sensor.

20. The method of claim 16, including:
correcting non-orthogonal orientations of the magnetic sensors; and/or
compensating for cross-axis effects in the magnetic sensors.

21. The method of claim 16, wherein the step of mechanically protecting includes mechanically protecting the magnetic field sensor and the chargeable power source during blasting of the medium in which the magnetic field sensor and the chargeable power source are embedded.

* * * * *